(12) United States Patent
Pandya et al.

(10) Patent No.: US 12,411,212 B1
(45) Date of Patent: Sep. 9, 2025

(54) MOBILE SAFETY SYSTEMS

(71) Applicant: Everguard, Inc., Irvine, CA (US)

(72) Inventors: Sandeep Pandya, Irvine, CA (US); Sundeep Ahluwalia, San Diego, CA (US); Changsoo Jeong, Rancho Palos Verdes, CA (US); Michael Korkin, Glendale, CA (US); Kyungsuk Lee, Rancho Palos Verdes, CA (US); Christopher Ro, Aliso Viejo, CA (US); Yong Wu, Signal Hill, CA (US)

(73) Assignee: Everguard, Inc., Irvine, CA (US)

( * ) Notice: Subject to any disclaimer, the term of this patent is extended or adjusted under 35 U.S.C. 154(b) by 1135 days.

(21) Appl. No.: 17/307,542

(22) Filed: May 4, 2021

Related U.S. Application Data

(60) Provisional application No. 63/022,964, filed on May 11, 2020.

(51) Int. Cl.
    *G01S 7/48* (2006.01)
    *G01S 7/4915* (2020.01)
    (Continued)

(52) U.S. Cl.
    CPC .......... *G01S 7/4802* (2013.01); *G01S 7/4915* (2013.01); *G01S 17/42* (2013.01); *G01S 17/894* (2020.01); *G06N 20/00* (2019.01)

(58) Field of Classification Search
    CPC ...... G01S 7/4802; G01S 7/4915; G01S 17/42; G01S 17/894; G06N 20/00
    See application file for complete search history.

(56) References Cited

U.S. PATENT DOCUMENTS 11,675,878 B1 * 6/2023 Pandya ................... G01S 17/86
                                                  382/103
11,803,955 B1 * 10/2023 Pandya ................ G08B 29/186
(Continued)

FOREIGN PATENT DOCUMENTS

CN          104376348      2/2015
CN          107742141      2/2018
(Continued)

OTHER PUBLICATIONS

Mandeljc et al., "Tracking by Identification Using Computer Vision and Radio", Sensors 2013, 13, 241-273 (Year: 2012).*
(Continued)

*Primary Examiner* — Luke D Ratcliffe
(74) *Attorney, Agent, or Firm* — Esplin & Associates, PC

(57) ABSTRACT

A mobile system is provided for managing safety in a dynamic environment. The system comprises: a computer vision component for generating a computer vision output data; a real-time locating component for generating location data about an object within the industrial environment; a LIDAR component for generating 3D point cloud data of the industrial environment; and one or more processors coupled to the computer vision component, the real-time locating component and the LIDAR component and configured to: (i) process the data stream with aid of a machine learning algorithm trained model to generate a safety related result and feedback data, and (ii) deliver the feedback data to the object via the mobile tag device, and a mobile platform configured to move the mobile system in the environment.

20 Claims, 4 Drawing Sheets

(51) Int. Cl.
*G01S 17/42* (2006.01)
*G01S 17/894* (2020.01)
*G06N 20/00* (2019.01)

(56) References Cited

U.S. PATENT DOCUMENTS

| | | | |
|---|---|---|---|
| 2003/0193398 A1* | 10/2003 | Geber | B60R 25/00 701/29.1 |
| 2015/0332463 A1 | 11/2015 | Galera | |
| 2018/0082244 A1 | 3/2018 | Brazeau | |
| 2018/0276841 A1 | 9/2018 | Krishnaswamy | |
| 2019/0209022 A1 | 7/2019 | Sobol et al. | |
| 2019/0236370 A1 | 8/2019 | Man | |
| 2019/0258251 A1 | 8/2019 | Ditty et al. | |
| 2019/0258878 A1 | 8/2019 | Koivisto | |
| 2019/0291723 A1 | 9/2019 | Srivatsa | |
| 2019/0303759 A1 | 10/2019 | Farabet et al. | |
| 2019/0324145 A1* | 10/2019 | Buehring | G01S 7/4815 |
| 2020/0034620 A1 | 1/2020 | Lutterodt | |
| 2020/0089942 A1 | 3/2020 | Man | |
| 2020/0202208 A1 | 6/2020 | Li | |
| 2020/0202472 A1* | 6/2020 | Barak | H04W 4/021 |
| 2021/0309460 A1* | 10/2021 | Kim | B65G 1/1373 |
| 2022/0187847 A1* | 6/2022 | Cella | G06Q 10/06 |
| 2024/0078656 A1 | 3/2024 | Pandya | |

FOREIGN PATENT DOCUMENTS

| | | | | |
|---|---|---|---|---|
| KR | 101907964 | | 10/2018 | |
| WO | WO-2019216975 A1 * | 11/2019 | | B62D 15/0215 |
| WO | WO-2020088739 A1 * | 5/2020 | | G05D 1/0094 |

OTHER PUBLICATIONS

"AI Insights for a Safer, Healthier and Productive Workforce." WearHealth, wearhealth.com/. Accessed on Apr. 22, 2020.

"AI-Powered Workplace Safety." Intenseye, http://www.intenseye.com/.Accessed on Apr. 22, 2020.

Cheng et al. Automated task-level activity analysis through fusion of real time location sensors and worker's thoracic posture data; Automation in Construction 29 (2013) 24-39.

"Connected Safety." Home-HIS, safety.honeywell.com/en-us/software-and-services/connected-safety. Accessed on Apr. 22, 2020.

"Connected Worker Solutions." Intel, http://www.intel.com/content/www/us/en/connected-worker/overview.html. Accessed on Apr. 22, 2020.

Co-pending U.S. Appl. No. 17/241,737, inventors Pandya; Sandeep et al., filed on Apr. 27, 2021.

"DeepCanopy." DeepCanopy, http://www.deepcanopy.com/. Accessed on Apr. 22, 2020.

"Guardhat." Guardhat, http://www.guardhat.com/. Accessed on Apr. 22, 2020.

"Hitachi Solutions IoT Service Hub for Worker Safety." Hitachi Solutions, us.hitachi-solutions.com/products/hitachi-solutions-iot-service-hub-for-worker-safety/. Accessed on Apr. 22, 2020.

"Home: Safety First." Safetyfirst, margad.wixsite.com/safetyfirst. Accessed on Apr. 22, 2020.

Mandeljc et al. Tracking by identification using computer vision and radio; Sensors 13:241-273 (2013).

Smartvid.io, Inc. "Minimize Risk across Projects with the Smartvid.io Platform." Minimize Risk across Projects with the Smartvid.io Platform, http://www.smartvid.io/our-platform. Accessed on Apr. 22, 2020.

"Video Analytics Partner." EasyFlow, easyflow.biz/. Accessed on Apr. 22, 2020.

"Worker Insights." Worker Insights | IBM Watson IoT, http://www.ibm.com/internet-of-things/solutions/enterprise-asset-management/worker-insights. Accessed on Apr. 22, 2020.

"Worker Safety." HCL Technologies, http://www.hcltech.com/Internet-of-Things-IoT/our-solutions/worker-safety#an-introduction. Accessed on Apr. 22, 2020.

Zhang et al. A framework of on-site construction safety management using computer vision and real-time location system. International Conference on Smart Infrastructure and Construction 2019 (ICSIC); pp. 327-333; available at http://doi.org/10.icsic.64669.327.

"Guardhat." Guardhat, http://www.guardhat.com/. Accessed on Apr. 22, 2020. (2 pages).

"Video Analytics Partner." EasyFlow, easyflow.biz/. Accessed on Apr. 22, 2020. (10 pages).

AI Insights for a Safer, Healthier and Productive Workforce. WearHealth, wearhealth.com/.Accessed on Apr. 22, 2020 (5 pages).

Smartvid.io, Inc. "Minimize Risk across Projects with the Smartvid.io Platform." Minimize Risk across Projects with the Smartvid.io Platform, http://www.smartvid.io/our-platform. Accessed on Apr. 22, 2020. (4 pages).

* cited by examiner

MOBILE SAFETY SYSTEMS

CROSS-REFERENCE TO RELATED APPLICATIONS

This application claims the priority and benefit of U.S. Provisional Application No. 63/022,964, filed on May 11, 2020, the entirety of which is incorporated herein by reference.

BACKGROUND

Safety and risk management in a dynamic or complex environment can be challenging. The conventional safety or security approach may require fixed facilities (e.g., surveillance camera) which may not be suitable for a dynamically changing environment such as construction sites, sports or entertainment venues, or other dynamically changing workspaces.

SUMMARY

Recognized herein is a need for methods and systems for managing safety and risk in a dynamically changing workplace with improved efficiency and accuracy. The present disclosure provides systems and methods for managing safety and risk of personnel performing operations in hazardous environments. In particular, the provided systems and methods utilize artificial intelligence (AI) solution that scans through multi-sensor inputs in real-time and proactively alerts individuals and managers to safety concerns. The provided systems may be mobile safety systems that facilitate the quick and easy implementation of flexible and customizable safety management for a dynamically changing environment such as shopping mall, warehouse, dock or shipping yard, airport, manufacturing facility, urban or rural housing, automotive dealer lot, production facility, production overflow lot, construction site, park, entertainment venue, sports venue, convention center, amusement park, carnival, or school.

In some embodiments of the disclosure, the provided mobile safety system may comprise a multimodal safety system and a mobile platform. The multimodal safety system may include a multimodal sensor suite comprising at least computer vision, real-time locating system (RTLS), light detection and ranging (LIDAR) systems or other sensors (e.g., IMU) to provide a comprehensive coverage for each zone. The multimodal safety system of the present disclosure merges computer vision, real-time locating, AI, sensor fusion and analytics in combination with multiple sensors to provide real time, actionable oversight that ensures personnel safety.

In some cases, the mobile safety systems may comprise a mobile platform allowing the multimodal safety system easily transported to a desired location; and once at the location can be easily maneuvered to different locations. The mobile platform can be a highly mobile and maneuverable platform which contains all operational components for power, wide scale safety monitoring, alerting and management.

The mobile safety system may be suitable for varying climates, locations, and weather. For instance, the mobile safety system may comprise electrical power generating means, associated electronic circuitry for operation of the sensor suite, control circuitry to operate the deployment system, and all electrical interconnections. All of these components and circuitry may be preassembled and shielded from environmental concerns.

An aspect of the present disclosure provides a mobile safety system for managing safety in a dynamic environment. The mobile safety system comprises: a computer vision component for generating a computer vision output data; a real-time locating component for generating location data about an object within the industrial environment; a LIDAR component for generating 3D point cloud data of the industrial environment; and one or more processors coupled to the computer vision component, the real-time locating component and the LIDAR component and configured to: (i) process the data stream with aid of a machine learning algorithm trained model to generate a safety related result and feedback data, and (ii) deliver the feedback data to the object via the mobile tag device, and a mobile platform configured to move the mobile system in the environment The term "labeled dataset," as used herein, generally refers to a paired dataset used for training a model using supervised learning or semi-supervised learning. The term "label" or "label data" as used herein, generally refers to ground truth data. During a training process, the weights or parameters of a deep learning model (e.g., CNN, DNN) are tuned to approximate the ground truth data thereby learning a mapping from input sensor data to the desired output.

In some cases, the mobile safety system may also provide personal protective equipment (PPE) detection such as helmet safety zone compliance and fall detection, security event detection, emergency alerting, and various other functionalities. For example, upon detection of a safety infraction, individuals may be immediately notified via haptic feedback on their personal device (e.g., mobile device) or mobile tag device. Alert video and metadata may be simultaneously sent to an administrator or safety manager portal for post-event analysis. The mobile tag device may be a precise positioning device showing individual and asset/object locations within less than 1.5 feet and can alert individuals of danger zones and risks before accidents happen. In some cases, the mobile tag device may be an industrial-grade wearable device can be worn by an individual or carried by mobile asset (e.g., vehicle, crane, machine, etc.) within the monitored zone.

Some embodiments of the present disclosure provide a platform allowing for real-time situational awareness and insights into personnel activity thereby increasing productivity and ensuring individuals (e.g., workers, operators) are acting within safety requirements. Systems and methods of the present disclosure provide an end-to-end solution that offers actionable insights in real time. Systems and methods of the present disclosure combine computer vision and sensor fusion to provide safety at the edge for precise individual's activity recognition. An analytics portal of the platform may deliver continuous safety data to help recognize improvements in individual's behavior and operations management, as well as maintenance of equipment, and software applications running on the edge and the cloud.

The real-time platform of the present disclosure may cooperate ultra-accurate and reliable wearables with computer vision, machine learning and AI to improve productivity, safety and/or security in a monitored area. The platform may be configured for managing workplace safety and risk, detecting, predicting and managing risks in an industrial environment or other dynamic environments. In some cases, the platform may comprise one or more mobile safety systems deployed to the monitored area each utilizing machine learning and AI technologies to optimize fusion of multimodal data. In some embodiments of the disclosure, each of the one or more mobile safety systems may utilize at least three different sensory modalities: a computer vision component, a real-time locating component, and a LIDAR component.

Each of the three modalities may have their own advantages and disadvantages. It is desirable to provide an intelligent system to fuse these modalities in an optimized manner to improve the accuracy and efficiency of providing a 3D scene map with understanding of the scene (e.g., location tracking, identity recognition, collision avoidance, fall and trip detection, accident or risk detection and prediction, etc.) thereby causing an appropriate action such as the delivery of individual or group alerts to workers, as well as other actions (e.g., interventions, control commands to machines to change operation state, etc.) to improve industrial safety.

Computer vision (CV) techniques or computer vision systems have been used to process images to extract high-level understanding of the scene (e.g., industrial workplace, construction site, etc.). CV techniques may have the capabilities of object detection, object tracking, action recognition or generating descriptions of a scene (e.g., object detection, object classification, extraction of the scene depth and estimation of relative positions of objects, extraction of objects' orientation in space, anomaly detection, detection of an unsafe situation, etc.). However, CV systems are known to have limited accuracy such as due to limited computational power. For example, deep convolutional neural networks are known to improve accuracy with an increased number of network layers. One source of inaccuracy in computer vision is the limited computational power, constrained by cost, size, weight, power, and heat dissipation. Another source of inaccuracy in computer vision is the limited resolution. An effective system resolution is a product of the intrinsic and extrinsic factors. Intrinsic factors may include, for example, optical blur of the camera's lens, focal length, and the spatial sampling rate of the image sensor. Extrinsic factors include illumination of the scene and its dynamic range. Target image brightness under given illumination is typically achieved by setting the exposure time. Longer exposure causes motion blur as a result of object motion or camera physical motion thereby reducing effective system resolution. To avoid motion blur, target image brightness may be achieved by increasing or decreasing the imaging system's gain. Increased gain amplifies signal noise which similarly reduces the effective system resolution. Furthermore, the location tracking by individual's identification is more challenging in industrial context or uniformed environments where individuals become visually indistinguishable due to similar uniform (e.g., PPE) which may result in errors in identity tracking.

Real-time locating system (RTLS) may automatically identify and track the location of objects or people in real time, usually within a building or other contained area. RTLS may involve using wireless RTLS tags attached to objects or worn by people, and in most RTLS, fixed reference points receive wireless signals from tags to determine their location. However, inaccuracy in the RTLS measurement can be caused by multi-path reflections of radio waves from objects in the scene, poor antenna sensitivity, weak radio signal strength, obstructions and occlusions in the line of sight between transceivers and signal attenuation by large metal objects.

Light detection and ranging (LIDAR) technology can be used to obtain three-dimensional information of an environment by measuring distances to objects. In contrast to the real-time locating systems that provide sparse scene coverage representing locations of a small number of mobile tags present in the scene (e.g., trajectories of individuals), LIDAR can provide a substantially dense three-dimensional representation of the scene. However, inaccuracy in LIDAR system may be caused by obstructions and occlusions in the line of sight which may lead to potential misclassification of environment and resolution in the 3D space.

The mobile safety system may combine the three different sensory modalities i.e., a computer vision component, a real-time locating component, and a LIDAR component via a local intelligent fusion framework. In some embodiments, the multimodal safety system may combine at least four different sensory modalities i.e., a computer vision component, a real-time locating component, a LIDAR component and inertial measurement unit (IMU) data via a local intelligent fusion framework. In some cases, the mobile safety system may be capable of detecting objects' locations in the scene and identifying them by utilizing mobile tag data provided by the real-time locating component and then tracking objects' orientation, relative positions and boundaries in three dimensions in real-time by using LIDAR 3D point cloud data and camera images. In some cases, a proximity between two or more objects in the scene as determined by the system from mobile tag data, camera images and LIDAR data may cause an alert delivered to an individual worker or a group if such proximity falls below set thresholds to prevent a collision.

In some cases, the provided systems and methods may help individuals such as workers to comply with safety protocols, improve situational awareness for hazardous environments and conditions, and enforce pro-active safety behaviors based on real-time tracking and unsafe situation detection.

Example embodiments are described with reference to the management and monitoring of safety in an industrial environment (e.g., construction site), warehouse, dock or shipping yard, airport, manufacturing facility, entertainment venue, sports venue, convention center, amusement park, carnival, school, shopping mall, urban or rural housing, automotive dealer lot, production facility, production overflow lot, park, and the like. It is to be understood that the invention itself is more broadly applicable to a dynamically changing place/zone/environment, by tracking of persons and objects/assets in the place and providing safety alert and actions with aid of a highly mobile and quick-deployment platform of the invention.

In an aspect of the disclosure, a mobile system for managing safety in an environment is provided. The mobile system comprises: a mobile platform configured to move the mobile system in the environment; a computer vision component for generating a computer vision output data; a real-time locating component for generating location data about an object within the environment; a light detection and ranging (LIDAR) component for generating 3D point cloud data of the environment; and an edge computing device coupled to the computer vision component, the real-time locating component and the LIDAR component and configured to: receive a data stream including the computer vision output data, the location data and the 3D point cloud data to generate an input feature dataset, process the input feature dataset using a machine learning algorithm trained model to generate a safety related result.

In some embodiments, the mobile system further comprises a gateway device for establishing a connection with a cloud to download an updated machine learning algorithm trained model. In some embodiments, the mobile system further comprises a power source to power the computer vision component, the real-time locating component, the LIDAR component and the edge computing device. In some embodiments, the mobile system further comprises a detector for detecting an unauthorized removal of a component of the mobile platform.

In some embodiments, the real-time locating component includes a mobile tag device deployed to the object to provide an identity about the object. In some cases, the mobile tag device comprises a motion sensor collecting motion data about the object such that the data stream further includes the motion data.

In some embodiments, the machine learning algorithm trained model further generates a feedback that is delivered to the object. In some cases, the safety related result includes a detection of an action of the object that does not comply with a safety protocol and the feedback data comprises an alert indicative of the detection delivered to the object via the mobile tag device. In some cases, the feedback data comprises a control signal to effect an operation of the object. In some embodiments, the computer vision output data comprises a description of the environment.

In a related yet separate aspect, a method for managing safety in an environment using a mobile system is provided. The method comprises: generating, using a computer vision component of the mobile system, a computer vision output data; generating, using a real-time locating component of the mobile system, location data about an object within the environment; generating, using a light detection and ranging (LIDAR) component of the mobile system, 3D point cloud data of the environment; receiving, at an edge computing device located at the mobile system, a data stream including the computer vision output data, the location data and the 3D point cloud data to generate an input feature dataset, processing, by the edge computing device, the input feature dataset using a machine learning algorithm trained model to generate a safety related result, and providing a mobile platform for moving the mobile system in the environment.

In some embodiments, the method further comprises establishing, via a gateway device of the mobile system, a connection with a cloud to download an updated machine learning algorithm trained model. In some embodiments, the method further comprises detecting, with aid of a detector, an unauthorized removal of a component of the mobile platform.

In some embodiments, the real-time locating component includes a mobile tag device deployed to the object and is configured to provide an identity about the object. In some cases, the mobile tag device comprises a motion sensor collecting motion data about the object and wherein the data stream further includes the motion data. In some cases, the method further comprises generating a feedback data, by the machine learning algorithm trained model, to be delivered to the object. For example, the safety related result includes a detection of an action of the object that does not comply with a safety protocol and the feedback data comprises an alert indicative of the detection delivered to the object via the mobile tag device. In some cases, the feedback data comprises a control signal to effect an operation of the object. In some embodiments, the computer vision output data comprises a description of the environment.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
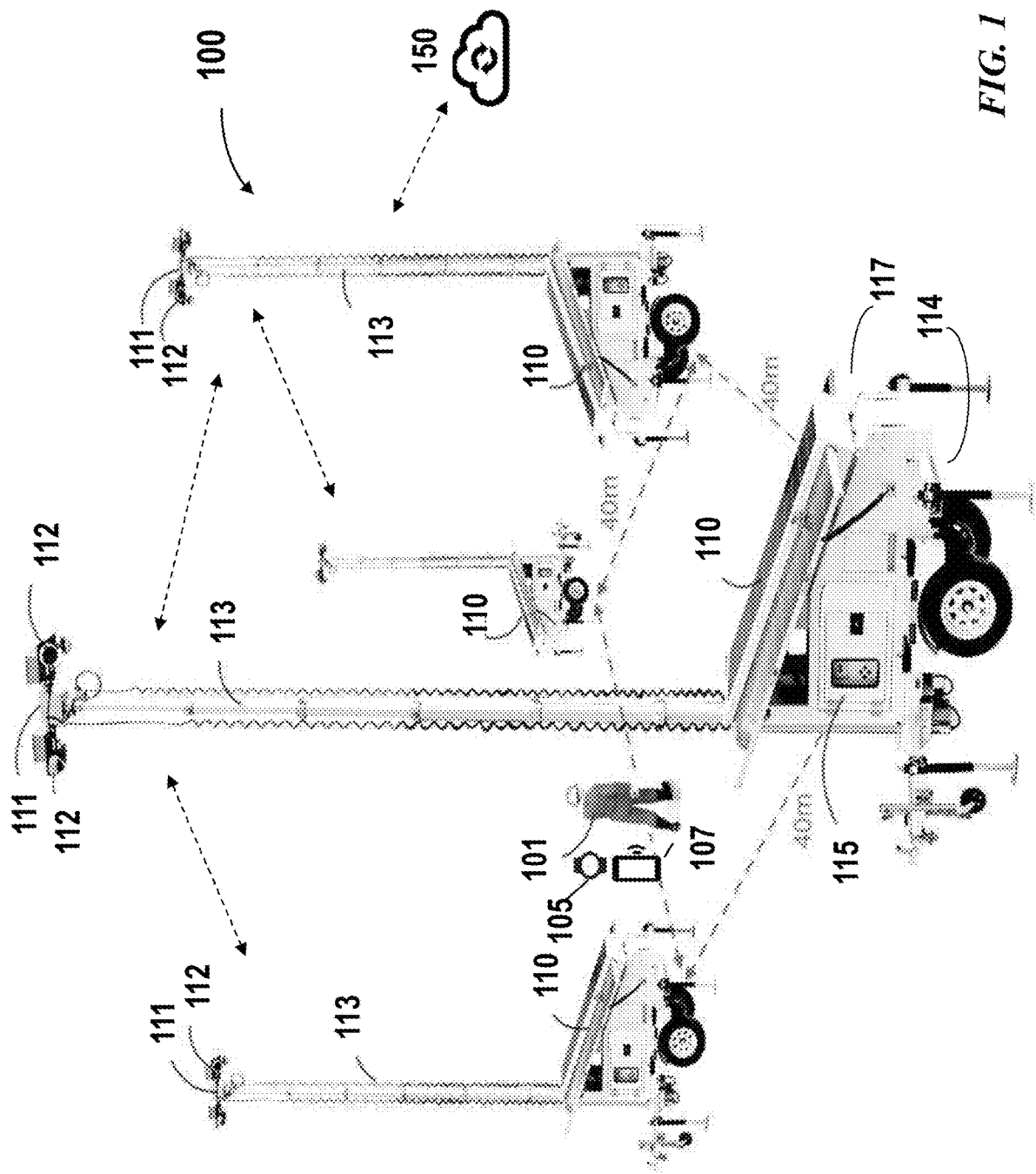
FIG. 1 illustrates a mobile safety system comprising a plurality of mobile platforms deployed in a monitored zone or environment, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form The term "real-time," as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event. One or more operations in the present disclosure can be performed in real-time or near real-time.

The present disclosure provides methods and systems for safety management in a dynamically changing environment where quick, efficient equipment deployment and set up may be desired. The mobile safety system may provide safety management and monitoring to environments such as an industrial environment (e.g., construction site), warehouse, dock or shipping yard, airport, manufacturing facility, entertainment venue, sports venue, convention center, amusement park, carnival, school, shopping mall, urban or rural housing, automotive dealer lot, production facility, production overflow lot, park, and the like. The workplace may be dynamic and complex and may change over time. In some cases, the workplace may be temporary such that affixed safety equipment may not be desired for cost concern.

In some cases, the mobile safety system may be deployed to a hazardous environment which can be an indoor workplace, an outdoor workplace, a place where hazardous work is conducted such as an industrial environment, a construction site, manufacturing plants, warehouse, dock or shipping yard, and various others that can be dynamic, complex, and hazards can arise from the unsafe behavior of on-site personnel and/or equipment (e.g., machines, vehicles, etc.). The present disclosure may provide situational awareness functionality, safety management based on location tracking and unsafe situation detection that may be used in various contexts, including construction site, shipping, mining, oil, gas, metal, paper mills, healthcare, manufacturing environments and various other fields as descried above. The real-time location tracking, behavior enforcement and situational awareness functionality of the present disclosure may be used for various uses/applications, such as Internet of Things (IoT) platforms, health-monitoring software applications and business processes or industrial workplace management, and for organizations in energy, manufacturing, aerospace, automotive, chemical, pharmaceutical, telecommunications, healthcare, the public sector, and various others.

Mobile Safety System

The present disclosure provides systems and methods for managing safety in a dynamic environment or workplace. The provided systems and methods can be applied to safety and risk detection or management related to various aspects of industrial workplace or temporary workplace where quick, efficient equipment deployment and set up may be desired. For example, mobile safety systems of the present disclosure may provide safety management and monitoring to industrial environment (e.g., construction site, warehouse, dock or shipping yard, airport, manufacturing facility, production facility, production overflow lot, etc.) or non-industrial environment (e.g., entertainment venue, sports venue, convention center, amusement park, carnival, school, shopping mall, urban or rural housing, automotive dealer lot, park, etc.) which may include, personnel (e.g., worker, employee, operator, etc.) safety behavior change or guide, real-time alert or warning to individuals, safety control of workplace asset (e.g., machines, equipment) to avoid collision or accident, location tracking of individuals, materials or asset within a workplace (e.g., construction site), situational awareness of hazardous work/condition, safety protocol compliance, and detection and prevention of accidents and other safety or security events (e.g., crime, accidents, emergency, etc.) happening to the individuals within the workplace or monitored environment.

The mobile safety system may comprise a multimodal safety system and a mobile platform. The multimodal safety system may be a location and/or time-based system that may utilize real-time multimodal sensor data for incident detection, location tracking per identification, alerting, triggering safety operation of machines, and safety behavior compliance. In some cases, the multimodal safety system can analyze data collected from multi-modal sensor suite or devices to generate contextual descriptions of 3D scene of the monitored workplace which may include, for example, object detection, object classification, extraction of the scene depth and estimation of relative positions of objects, extraction of objects' orientation in space, anomaly detection, detection of an unsafe situation or security events, identify safety operation processes, capture personnel-based metrics (e.g., fatigue level, health condition, under-stress, physiological state, improper posture, etc.), detect an incident (e.g., trip, slip or fall) or accident (e.g., emergency, explosion, spill, etc.), identify a hazardous situation or hazardous conditions in a zone of a workplace, identify an efficient workflow for one or more individuals (e.g., workers, employee, customers, users, etc.) and one or more groups within a workplace and various others.

In some embodiments of the mobile safety system, multimodal sensory data may be collected from a computer vision component, a real-time locating system (RTLS), a LIDAR component and wearable sensors worn by or attached to personnel performing tasks/activities or objects (e.g., equipment) within a workplace. The sensor data, processed data, and related data flow may be communicated over a network suitable for use in a dynamically changing environment that may be indoor environment, outdoor environment, or a combination of both. In some cases, the environment may be dynamically changing (e.g., construction site) over time. For instance, assets or objects within the environment may be moving or changing over time. In some cases, the environment monitored by the mobile safety system may be temporary (e.g., sport, entertainment venue, sports venue, convention center, amusement park, carnival, school event, etc.). In some cases, the environment may be an area with limited wireless Internet or cellular network access, or an area with connection to a wide area network ("WAN") or an inter-network (e.g., the Internet) not readily available.

FIG. 1 illustrates a mobile safety system comprising a plurality of mobile platforms 110 deployed in a monitored zone or environment 100. The plurality of mobile platforms 110 may include at least one edge server (e.g., edge computing device) 115 for processing data collected from a multimodal sensor suite 111, 112, one or more mobile tag devices 105, and providing real-time feedback to an individual 101 or user (e.g., onsite manager), and a backend management system 150 (e.g., cloud server).

In some embodiments of the present disclosure, each mobile platform 110 may comprise a chassis 114 to transport the mobile safety system to desired locations. The platform can be a highly mobile and maneuverable platform which contains all operational components for power, computation, and sensor package for safety monitoring, alerting and management.

The mobile platform 110 may be capable of freely roaming about an environment. The mobile platform may move along two dimensions. The mobile platform may move over a surface. The chassis 114 may be a truck or comprise appropriate propulsion units allowing the mobile platform to move in any environment such as construction site. For example, the chassis may move about with the aid of one or more propulsion units, which may include continuous track, wheels, rollers, legs, arms, propellers, rotors, treads, gliders, or other components that can be used to propel a mobile safety system.

The propulsion unit may be driven with aid of one or more drive units. For example, a motor, engine, drive train, or any other component may be provided that may aid in driving the propulsion of the mobile safety system. In some instances, a drive unit may be proximally located to the propulsion units to drive the propulsion units. Alternatively, they may be operably linked without necessarily being adjacent or in close proximity to one another.

In some cases, mobile platform may be operated to transport the mobile safety system into a desired location by a human operator. In some cases, one or more components of the mobile safety system (e.g., deployable on crane, support assembly) can be controlled remotely.

The mobile safety system may be of any size. One or more dimensions of the mobile safety system (e.g., length, width, height, diameter) may be less than or equal to 1 m, 1.5 m, 2 m, 3 m, 4 m, 5 m, 7 m, 10 m, 12 m, 15 m, 20 m, or 25 m. One or more dimensions of the system may be greater than any of the values provided, or fall within a range between any two of the values provided. One or more dimensions of the enclosure may be greater than any of the values provided or fall within a range between any two of the values provided. In some embodiments, a maximum dimension of the mobile safety system (greatest of length, width, or height) may have a value less than any of the values provided, greater than any of the values provided, or falling within a range between any two of the values provided.

In some embodiments of the mobile safety system, at least a portion of the multimodal safety system (e.g., sensor suite 111, 112) is supported by a support assembly 113 on at least one of the plurality of mobile platforms 110 so that a portion of the multimodal safety system is elevated above a surface. The support assembly may be or may include a pole, beam, mast, tower, structure, or any other type of mount. In some instances, the support assembly may be provided below the sensor suite, and/or to the side of the sensor suite. In some cases, the support assembly may be a mast support assembly. The support assembly may elevate the sensor suite to a desired height above the surface. In some embodiments, the height may be greater than or equal to about 1 m, 1.5 m, 2 m, 3 m, 4 m, or 5 m or any number in between.

In some cases, the support assembly may be extendable or foldable. The support assembly may be mounted to a base via a joint, and/or joint at the middle, allowing it to be folded back or extended. The one or more joints may also allow it to be articulated so that its distal end can reach a range of positions. The movement/motion/position of the support assembly may be controlled via a controller onboard the mobile safety system or remotely.

In some cases, the distal end or the sensor suite can be articulated relative to the mobile platform or the base. This may beneficially allow for controlling of the camera 112 or LIDAR device orientation thereby controlling a line-of-sight of the sensor device (e.g., imaging device). In some cases, the support assembly may allow up to 6 degrees of freedom (DOF) along the X, Y, and Z axes and/or in the coronal, median, and transverse planes. In some cases, the support assembly may be a 3-axis robot arm. The robot arm may be capable of moving about 1 or more, two or more, three or more, four or more, five or more, or six or more axes of motion. The robot arm may comprise one or more, two or more, three or more, four or more, five or more, six or more, seven or more, eight or more, nine or more, or ten or more joints. The joints may comprise motors that may allow various support members to move relative to one another. The robot arm may comprise one or more, two or more, three or more, four or more, five or more, six or more, seven or more, eight or more, nine or more, or ten or more support members.

In one example, a first support member may bear weight of an end effector or the sensor suite 111, 112. A second support member may bear weight of the first support member and/or the end effector, and so forth. The motors may allow rotation of one or more support members relative to one another. One or more sliding mechanism may be provided that may allow lateral displacement. One or more telescoping components for support members may or may not be provided. This may allow the length of the support members to be extended or retracted. Ball and socket joints may or may not be employed by the support assembly.

In some embodiments of the present disclosure, the safety platform may employ an edge intelligence paradigm that data processing and prediction/inference is performed at the edge computing device 115 of at least one of the platforms 110 while the predictive or detective models may be built, developed, trained or retrained on the backend management system 150 residing on a cloud/data center and run on a user device (e.g., hardware accelerator) deployed at the scene 100 and/or the edge computing device 115 for inference. The edge computing device 115 may be located on the chassis 114 of the platform 110, located at the distal end of support assembly as part of the sensor suite or a combination of both.

In some cases, sensor data stream may be sent to the edge computing device 115 in real-time for managing on-site operations, safety and risk within a worksite, whereas a message package comprising batch data may be sent to a remote management console or the cloud at a lower frequency for post-event analysis. In some instances, the edge computing device may implement a multimodal sensor fusion. Details about the multimodal sensor fusion and data processing are described later herein.

The mobile platform 110 may include a base station 117 which may comprise a plurality of electrical components (i.e., the processor module(s), the memory module(s), the wireless interface, and the radio transceiver), and power source. The power source may power the mobile platform or the base station. The power source may power any other components of the mobile safety system, such as sensors, edge computing device 115, communication unit, controller, memory, support assembly, or other electricity-powered components. The same power supply may be used for multiple components, or different power supplies may be used for different components. Batteries may also be exchanged or swapped out. Details about the power source and base station are described later herein.

In some cases, the base station or the sensor suite may have a robust housing that may be resistant to water or dents. The sturdy housing may protect sensors or base station from harmful environmental conditions. The mobile platform may have a housing that may be resistant to rain, snow, wind, ice, mud, dirt, smoke, fire, or other environmental condition.

In some cases, one or more platforms 110 comprising the mobile safety system may be deployed in a dynamic workplace (e.g., sports venues) or hazardous workplace (e.g., construction site). In some situations, the workplace may be facilitated with local area network but may have limited wireless Internet or cellular network access particularly when the workplace is in a remote area that is remote from a wide area network ("WAN") or an inter-network (e.g., the Internet), or when the workplace is a temporary or dynamic place without sufficient network coverage. The workplace may have indoor and outdoor area or work/safety zones where operations, tasks and duties are performed.

Operations, activities or tasks performed by one or more individuals 101 (e.g., workers, operators, employees, visitors, managers, etc.) may be tracked and guided based on real-time sensor data and feedbacks. In further embodiments of the disclosure, at least part of the sensor data may be captured by the multimodal sensory suite 111, 112 and one or more sensors from a user's electronic device 107, user's wearable device, mobile tag devices 105, and the like.

In some embodiments, an individual 101 (e.g., operator, worker, employees, participants, users, etc.) may be associated with one or more sensors. In some cases, an individual may be associated with one or more types of sensors that can be located on the individual's body (e.g., attached to skin), a part of body (e.g., wearable device or mobile tag devices 105) or clothing (e.g., PPE). In some cases, the one or more types of sensors may be located remotely from an individual, such as deployed in an environment (e.g. wall-mounted, attached to a machine, vehicle or other equipment, etc.) or located on a user device 107.

In some cases, a portable device such as wearable device or a mobile tag device 105 may be provided to an individual (e.g., worker) 101. The mobile tag device 105 may provide precise tracking of the individual 101 as part of the real-time locating system. In some cases, the portable device may be a precise positioning wearable device showing an individual and asset locations within less than 1.5 feet and can alert individuals of danger zones and restricted areas before accidents happen. The portable device may be an industrial-grade wearable device. The portable device may include other computing devices that are capable of presenting feedback information to a user. Examples of portable devices may include, but are not limited to, mobile devices, smartphones/cellphones, tablets, personal digital assistants (PDAs), laptop or notebook computers, desktop computers, media content players, virtual reality systems, augmented reality systems, or microphones. The portable device may be any electronic device capable of analyzing, receiving user input data (e.g., receiving user input for an incident report or trigger an emergency alert, etc.), providing or displaying certain types of feedback data (e.g., adverse event statistics, alert, behavior change cue, etc.) to a user. In some cases, a manager user device may be provided to one or more managers, supervisors or users allowing the them to monitor and view the real-time safety condition in the worksite.

In some embodiments of the present disclosure, multiple mobile platforms 110 may comprise a multimodal safety system including at least a computer vision-based component, a RTLS component and LIDAR component. In some cases, the multimodal safety system may include one or more sensors such as camera 112, RTLS transceiver 111 located at the distal end of the support assembly 113 and is positioned above a surface to capture a desired view of the worksite. The one or more transceivers of the RTLS component may be located at the base station 117, at the distal end of the support assembly, or any other suitable location of the mobile platform 110. One or more LIDAR devices may be located at the base station 117, at the distal end of the support assembly, or any other suitable location of the mobile platform 110. The multimodal safety system may further include various types of sensors carried/worn by or attached to the individuals 101 or a movable object. For example, one or more types of sensors may be included in a mobile tag device 105 worn by or attached to the individuals 101 or a movable object (e.g., machine, vehicle, construction site equipment, asset, etc.).

In some embodiments of the present disclosure, the mobile tag device 105 may serve as a radio transmitter as part of the RTLS component for tracking identification/location of the individual 101 and/or a movable object. For example, the mobile tag devices 105 may be BLE compatible or ultra-wideband (UWB) compatible so as to determine an individual's or mobile equipment's relative physical location to a beacon. In some cases, the mobile tag device 105 may be a precise positioning wearable device showing worker and asset locations within less than 1.5 feet and can alert workers of danger zones and restricted areas before accidents happen. The mobile tag device 105 may be an industrial-grade wearable device.

In yet another embodiment of the present disclosure, the mobile tag device 105 may include sensors such as physiologic sensors, kinematic sensors, audio sensors, inertial sensors (e.g., accelerometers, gyroscopes, and/or gravity detection sensors, which may form inertial measurement units (IMUs)), outdoor location sensors (e.g., global positioning system (GPS) sensors, mobile device transmitters enabling location triangulation), heart rate monitors, external temperature sensors, skin temperature sensors, skin conductance, neural signals (e.g. EEG), muscle signals (e.g. EMG), capacitive touch sensors, sensors configured to detect a galvanic skin response (GSR), vision sensors (e.g., imaging devices capable of detecting visible, infrared, or ultraviolet light, such as cameras), proximity or range sensors (e.g., ultrasonic sensors, lidar, time-of-flight or depth cameras), attitude sensors (e.g., compasses), pressure sensors (e.g., barometers), humidity sensors, vibration sensors, audio sensors (e.g., microphones), and/or field sensors (e.g., magnetometers, electromagnetic sensors, radio sensors). Sensor data provided by the mobile tag device may be analyzed along with the data collected from the multimodal sensory components to further improve the accuracy and understanding of the worksite safety conditions.

In some embodiments, the mobile tag device 105 may comprise one or more sensors for detecting a position, orientation or motion state (e.g., speed, acceleration, etc.) of an individual who wears the mobile tag device or a movable object carries the mobile tag device. Such sensor data may provide an additional modality to the multimodal sensory system. The one or more sensors may include at least an inertial measurement member. The inertial measurement member may comprise one or more gyroscopes, velocity sensors, accelerometers, magnetometers, and one or more location sensors. The inertial sensor may be used for obtaining data indicative of a spatial disposition (e.g., position, orientation, or angle) and/or motion characteristic (e.g., translational (linear) velocity, angular velocity, translational (linear) acceleration, angular acceleration) of the movable object. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three angular accelerometers can be used to provide angular acceleration data along three different axes of motion. The three directions of motion may be orthogonal axes. One or more of the angular accelerometers may be configured to measure acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion.

In some cases, the mobile tag device (e.g., wearable device 105) may be capable of delivering an alert (e.g., vibration, audio alarm, etc.) in response to a detection of an incident (e.g., trip, fall) or a security event (e.g., emergency, accident, crime, etc.), an intervention for changing behavior (e.g., fatigue detection or heat exhaustion) or forecasting a hazardous situation (e.g., prediction of an impending adverse event in a work zone or a physiological condition of the individual). For example, upon the prediction of an impending adverse event (e.g., entering a hazardous work zone, reaching a fatigue level, etc.), intervention such as rhythmic cue, audio, visual, or tactile stimulus may be delivered to the worker via the wearable device, mobile tag device 105 or sensors. In another example, upon detection of a safety infraction, individuals may be immediately notified via haptic feedback on the mobile tag device 105. The alert video and metadata may be simultaneously sent to the safety manager portal for post-event analysis and coaching on the remote entity 150.

In some cases, a plurality of mobile safety systems may be deployed in various locations within the environment 100 for detecting a hazardous situation or adverse event in the environment and providing warning or feedback information. In some situations, the environment may be a worksite that can have various regions or work zones which can be associated with a plurality of sensors or mobile safety systems deployed therein. The plurality of sensors may comprise cameras, LIDAR device and transceivers as part of the sensor suite of the mobile safety system. In some cases, sensors deployed within the worksite can further include, for example, a navigation system of a mobile worksite (e.g., vessel or ship) such as radar, sonar, differential global positioning system (DGPS), sensors on a user device such as inertial measurement unit (IMU), gyroscopes, magnetometers, accelerometers, audio sensors, conductivity sensors, ambient environment sensors such as temperature/heat sensors, chemical sensors, biological sensors, radiation sensors, or any other type of sensors, or combination thereof. The plurality of sensors deployed throughout the target scene may be used to detect ambient environment condition in a work zone, and/or work in conjunction with the sensor or user devices for location and time-based tracking, incident detection, and providing situational awareness to the individuals 101.

The computer vision-based component may include one or more imaging devices (e.g., cameras) 112. One or more cameras may be supported by the support assembly 113 and an orientation of line-of-sight of the camera may be controlled. In some cases, the imaging device may be a video camera. The camera may comprise optical elements and image sensor for capturing image data. The image sensors may be configured to generate image data in response to wavelengths of light. A variety of image sensors may be employed for capturing image data such as complementary metal oxide semiconductor (CMOS) or charge-coupled device (CCD). In some cases, the image sensor may be provided on a circuit board. The circuit board may be a printed circuit board (PCB). The PCB may comprise a plurality of electronic elements for processing the image signal. For instance, the circuit for a CMOS sensor may comprise AID converters and amplifiers to amplify and convert the analog signal provided by the CMOS sensor. Optionally, the image sensor may be integrated with amplifiers and converters to convert analog signal to digital signal such that a circuit board may not be required. In some cases, the output of the image sensor or the circuit board may be image data (digital signals) that can be further processed by a camera circuit or processors of the camera. In some cases, the image sensor may comprise an array of optical sensors.

In some cases, the camera may be a plenoptic camera having a main lens and additional micro lens array (MLA). The plenoptic camera model may be used to calculate a depth map of the captured image data. In some cases, the image data captured by the camera may be grayscale image with depth information at each pixel coordinate (i.e., depth map). The camera may be calibrated such that intrinsic camera parameters such as focal length, focus distance, distance between the MLA and image sensor, pixel size and the like are obtained for improving the depth measurement accuracy. Other parameters such as distortion coefficients may also be calibrated to rectify the image for metric depth measurement. The depth measurement may then be used for generating a 3D scene map and may be complemented by data provided by the RTLS component and LIDAR system.

In some cases, the camera 112 or the computer vision-based component may perform pre-processing of the captured image data. In an embodiment, the pre-processing algorithm can include image processing algorithms, such as image smoothing, to mitigate the effect of sensor noise, or image histogram equalization to enhance the pixel intensity values. In some cases, one or more processors of the computer vision-based component may use optical approaches as described elsewhere herein to generate a depth map of the target scene 100. For instance, an application programming interface (API) of the computer vision-based component may output a focused image with depth map. Alternatively, the depth map may be generated by inference engine of the computer vision system by fusing LIDAR data and camera data.

The RTLS component may include a plurality of RTLS reference points, which can be transmitters, receivers, or transceivers 111, onboard the mobile safety system comprised of a plurality platforms 110. As mentioned above, the transmitters, receivers, or transceivers may be located at the base station 117, the distal end of the support assembly, or any other location of the mobile safety system. Location of the RTLS reference points may be selected to provide the desired mobile tag coverage by deploying the plurality of mobile safety systems throughout the workplace 100. Deployment of the RTLS reference points may provide a coverage of that at least partially overlaps with the view of the computer vision system. This may beneficially supplement the location tracking per identity data to the descriptions of the 3D scene generated by the computer vision system. The location of the RTLS reference points may be determined by a locating module of the mobile system.

The RTLS reference points may be a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons or alternatively UWB anchors that transmit a continuous stream of packets that are picked up by a BLE transceiver or an UWB transceiver on the mobile tag device 105 or the wearable device.

For instance, with BLE, a position of mobile tag devices 105 (e.g., wearable devices) can be identified based on the proximity technology. The proximity technology may include a plurality of beacons distributed about a premise through which an individual 101 or mobile equipment 103 is located or to navigate. The mobile tag devices 105 may be BLE compatible so as to determine an individual's or mobile equipment's relative physical location to a beacon. Based on ranging data or approximate distance between user's device to each beacon along with the unique beacon's properties, different level of positioning accuracy can be achieved. For instance, the proximity technology may determine the location of a mobile tag devices 105 based on a proximity estimate of signal strength emitting from beacon. In addition, it can be enhanced with a beacon triangulation method to determine the (x, y, z) local map coordinates of individual's position referencing to three or more beacons in proximity. The receiver can estimate its position using average of x, y, z localized coordinates of a floor map for e.g. (x1, y1, z1), (x2, y2, z2) and (x3, y3, z3). The RTLS component may employ any suitable ranging and/or angulating methods which may include, for example, angle of arrival, angle of departure, line-of-sight, time of arrival, time difference of arrival, two-way ranging, symmetrical double sided two way ranging, near-field electromagnetic ranging or any combination of the above.

The RTLS component may utilize any suitable technologies to provide real-time locating. For instance, the RTLS may employ ultra-wideband (UWB) technologies, ultra-sound-based RTLS technologies, GPS-enabled RTLS, Wireless local area network, Bluetooth, and various other technologies to provide location tracking or proximity measurement. The accuracy may range from, for example, 0.1 m to 10 m. The RTLS component may select any combination of the aforementioned technologies to accommodate the deployment environment (e.g., indoor, outdoor, LAN availability, power consumption, accuracy requirement, etc.).

The LIDAR (light detection and ranging) component may obtain three-dimensional information of the target scene by measuring distances to objects. The LIDAR component may comprise one or more LIDAR devices onboard the mobile safety system. The one or more LIDAR devices may be located at the base station 117, the distal end of the support assembly, or any other location of the mobile safety system. The emitter of a LIDAR device may generate a sequence of light pulses emitted within short time durations such that the sequence of light pulses may be used to derive a distance measurement point. The LIDAR system may provide three-dimensional (3D) imaging (e.g., 3D point cloud) or further analysis (e.g., obstacles detection).

The LIDAR component may generate 3D point cloud data and/or analysis result (e.g., detection of an obstacle, detection of a collision, etc.). In some cases, the LIDAR component may be configured to detect changes in the target scene (e.g., construction site) that may be relevant to safety of the workspace. For example, the changes detected by the LIDAR system may include new structures getting erected or taken down (i.e., construction progress), equipment/asset installed or removed, materials delivered or removed from the scene, and other changes. Dynamic tracking of changes of the target scene may be utilized to estimate the precise location of individuals in the target scene and the proximity between objects.

It is noted that the local network can have various other configurations or utilize other suitable techniques. For example, instead of or in addition to Beacons, proximity sensors such as radio or RFID beacons, Global Positioning System (GPS) beacons, wireless location beacons, or other reference features may be provided within an indoor area. The reference features may include visually discernible markers, IR-discernible markers, UV-discernible markers, and/or beacons that may emit a wireless signal. The wearable device may be equipped with the corresponding sensors (e.g., camera) to track the location of an individual relative to the location of the reference features.

The one or more mobile platforms 110 may move to desired locations within the environment. A location of the mobile platform 110 may be tracked by a locating component onboard the mobile platform. For example, differential global positioning system (DGPS) sensor and/or the IMU may be used to assist the mobile platform in navigating its environment and determining the orientation/position of the sensor suite (e.g., camera, LIDAR) with respect to a global reference frame. Any description herein of a DGPS sensor may apply to any type of GPS sensor. The DGPS sensor can communicate with one or more ground based reference station and/or GPS satellites to obtain one or more GPS data signals. Location detection may occur in reference to GPS coordinates. The DGPS system may preferably use a network of fixed, ground-based reference stations to broadcast the difference between the positions indicated by the GPS satellite systems and the known fixed positions. The stations may broadcast the difference between the measured satellite pseudoranges and actual (internally computed) pseudoranges, and receiver stations may correct their pseudoranges by the same amount.

The DGPS sensor may be provided exterior to or within a housing of the base station or the sensor suite. The signals received by the DGPS sensor can be processed to determine the position of the mobile safety system relative to a global reference frame (e.g., latitude, longitude, and altitude), and thereby determining the orientation, location of the one or more sensors with respect to the target scene. The DGPS sensor can utilize any suitable GPS technology, such as differential GPS (DGPS) or real time kinematic (RTK) GPS. The GPS sensor can be configured to determine the position of the mobile safety system/sensors to any suitable level of accuracy, such as meter-level accuracy (e.g., within 10 m, 5 m, 2 m, or 1 m of accuracy) or centimeter-level accuracy (within 500 cm, 200 cm, 100 cm, 50 cm, 20 cm, 10 cm, or 5 cm of accuracy).

As mentioned above, the platform 110 may employ an edge intelligence paradigm that data processing and inference is performed at the edge computing device 115 (e.g., onboard processing unit) while the predictive or detective models may be built, developed and trained on a cloud/data center 150, and run on the edge computing server 115, user device 107 such as dashboard tablet for onsite managers (e.g., hardware accelerator), personnel device (e.g., wearable device, mobile tag device 105) for inference.

In some cases, data managed or transmitted to the edge computing device 115 may include, for example, data streams from the multimodal sensory systems/components 111, 112, data from the personnel device 107, the mobile tag device 105 or wearable device (e.g., motion data, physiological data, etc.) and/or user input data (e.g., user initiated report of an incident, alert, etc.). In some cases, data transmitted from the edge computing device to the multimodal sensory systems/components may include control signals or instructions to adjust one or more parameters of the computer vision component or LIDAR component for sensory data acquisition (e.g., scanning pattern of LIDAR, zoom factor, tilt-pan control of cameras, etc.) and/or instructions related to image processing performed by the computer vision component.

In some cases, data may be transmitted from the edge computing device 115 to the personnel device which may include, for example, alert, warning, feedback instructions/guidance of worker behaviors or navigational information that is generated by the edge computing device 115. In some cases, the data generated by the edge computing device 115 may include warning signal or interventions to the individuals 101 or the movable object (e.g., machines, vehicles, asset, etc.). For example, the data may include interventions delivered to the associated individual or control signals to an equipment. For instance, the interventions may comprise operations instructions/guidance to a worker in compliance with safety laws or protocols, and the control signals to an equipment may include a command to shut down or change a machine state of the equipment to avoid collision or other hazardous events. For example, the control signals may be delivered through machine's or equipment's PLC (programmable logic controller).

In optional cases, an additional user device 107 (e.g., tablet, mobile device) may be provided to a user. Alternatively, the user device may be the mobile tag device 105. The user device 107, 105 may be in communication with the edge computing device 115. Data transmitted from the user device to the edge computing device 115 may include, for example, user inputted data (e.g., confirmation of a task is completed), report provided by the individual, user-triggered alert (e.g., emergency alert) or a type of emergency. An individual may also be permitted to trigger an alert via the user device or the mobile tag device. Data transmitted from the edge computing server to the user device may include, for example, alert, real-time information about a hazardous situation in the worksite, interventions and others as described above.

The edge computing device 115 may analyze the multimodal data streams with aid of an intelligent framework including one or more predictive or detective models and/or anomaly detection models, the output result may be an alert indicating a detected incident such as fall or trip, an anomaly, a security event, emergency, or a prediction of an impeding adverse event such as a hazardous condition in a work zone, and various other functionalities as described later herein. The edge computing device 115 may be coupled to a local database.

Figure 2:
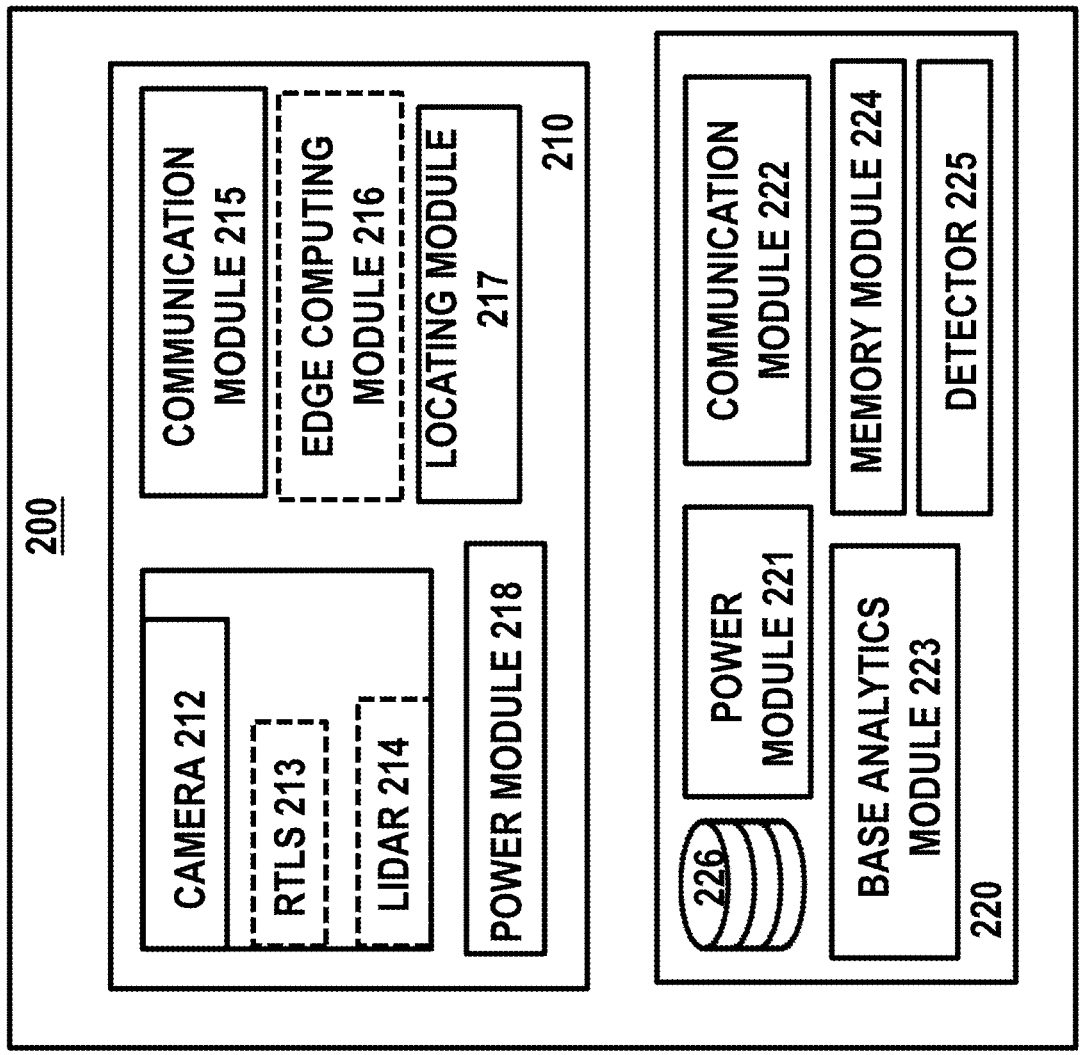
FIG. 2 schematically shows various components of a mobile safety system, in accordance with some embodiments of the present disclosure.

FIG. 2 schematically shows various components of a mobile safety system 200, in accordance with some embodiments of the present disclosure. The mobile safety system can be the same as the mobile safety system as described in FIG. 1. For example, the mobile safety system may comprise a plurality of platforms, each including a base station 220 and a sensor suite 210. The base station may comprise a plurality of electrical components such as processor module(s) (e.g., base analytics module 223), memory module(s) 224, a wireless interface (e.g., communication module 222), a detector 225, sensors (e.g., radio transceiver, LIDAR device, etc.), and/or a power source 221. The sensor suite may comprise one or more sensors (e.g., camera 212, RTLS component 213, LIDAR device 214), a power source 218, a communication module 215, a locating module 217, and a processor module (e.g., edge computing module 216). The sensor suite may be supported by a support assembly above the ground. It should be noted that one or more of the components can be located at either the sensor suite or the base station. For example, the radio transceiver of the RTLS component, LIDAR device, or the processors for implementing the edge analytics can be located at the sensor suite, the base station or a combination of both. In some embodiments, at least one of the plurality of mobile platforms includes an edge computing device.

One or more power sources may power the mobile platform. The power source may power any components of the platform, such as one or more sensors, communication unit, controller, memory, support assembly, or other electricity-powered components. The same power supply may be used for multiple components, or different power supplies may be used for different components. Batteries may also be exchanged or swapped out.

In some cases, a power module 218 may be located at the distal end of the support assembly or lo-located with the sensor suite of the mobile safety system. The power module may include one or more power supplies. A power supply may be an energy storage device, such as one or more batteries. In some cases, one or more of the energy storage devices may be photovoltaic devices. Alternatively, or in addition to, electric power may be supplied to the sensor suite components via a power cable running through the support assembly.

In some cases, the base station 220 may be powered by power module 223 which is located at the base station. The power module may include one or more power supplies. A power supply may be an energy storage device, such as one or more batteries. The batteries may be rechargeable batteries (i.e. secondary batteries). Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The one or more power supplies may power one or more components of the mobile safety system. The power supplies may be used to power propulsion of mobile platform, such as a motor that has the mean effect driving a continuous track or wheels of the mobile platform. The power supplies may power any other components of the mobile safety system or the base station, such as one or more sensors, communication unit, controller, memory, or other electricity-powered components. The same power supply may be used for multiple components, or different power supplies may be used for different components. Batteries may also be exchanged or swapped out.

In these cases, the mobile safety system 200 may be powered by a battery, by light energy (such as solar power), by wind energy, by hydroelectric energy, or by other power sources. For example, alternate power sources located in cars/trucks and commercial/retail/industrial/residential buildings can be utilized as power sources and can allow the base station or multimodal sensory systems to achieve their respective functionalities. Such alternative power sources may include 120V AC for houses, jobsites, and commercial purposes and 12V for ground vehicles such as cars and trucks. In some cases, the battery energy may be sufficient to ensure the system operate in a power conserving mode for at least a day, a week or a month.

The sensor suite 210 may comprise one or more sensors of the multimodal sensory system. In some cases, the one or more sensors may include at least imaging devices 212 whereas the RTLS component and the LIDAR device may be located at the base station. In some cases, the one or more sensors may include at least an imaging device 212 and a transceiver of the RTLS component 213 whereas the LIDAR device may be located at the base station. In some cases, the one or more sensors may include at least imaging device 212, a transceiver of the RTLS component 213 and the LIDAR component.

The locating module 217 may be located at the distal end of the support assembly, the base station, or any other location of the mobile safety system. The locating module 217 may track a location of the mobile safety system and can be the same as the locating sensor as described in FIG. 1. For example, the locating module 217 may include differential global positioning system (DGPS) sensor and/or the IMU to assist the mobile safety system in navigating its environment and determining the orientation/position of the sensor suite (e.g., camera, LIDAR) with respect to a global reference frame.

The communication module 215 may be configured to transmit data between the sensor suite 210, the base station and/or other entities in the network (e.g., cloud, user device, etc.). In some cases, the communication module 215 may be configured to transmit sensor data (e.g., image data, location data, etc.) captured by the sensors, or processed data generated by the edge computing module 216 to the processor modules 223 of the base station for further analysis/processing. The communication module may allow for data transmission via wired and wireless connection. In some cases, the communication 215 and/or the communication module 222 located at the base station may collectively form a network with other mobile safety systems to enable network coverage over the monitored environment.

Sensor suite 210 may optionally include an edge computing module 216 for processing at least a portion of the sensor data. In some cases, the edge computing module 216 may at least implement computer vision techniques to generate a computer vision output which is then transmitted to the base analytics module 223 for further analysis. For instance, one or more predictive or detective models may be implemented by the edge computing module for generating an output. In some cases, the edge computing module 216 may pre-process the sensor data and the processed sensor data may be transmitted to the base analytics module 223 for further analysis. The edge computing module 216 and the base analytics module 223 may collectively implement a multimodal sensor fusion which is described later herein with respect to FIG. 3.

The base station may include a local database that may comprise storage 226 containing a variety of data consistent with disclosed embodiments. For example, the databases may store raw data collected from the user device (e.g., sensors and wearable device) or mobile tag device (e.g., IMU data), data collected from the multimodal sensory systems 212, 213, 214, individual's or worksite's historical data, data about a predictive or detective model (e.g., parameters, hyper-parameters, model architecture, threshold, rules, etc), data generated by a predictive or detective model (e.g., intermediary results, output of a model, latent features, input and output of a component of the model system, etc.), incident report, record, workflow, safety protocols/law or regulatory related data, and user provided information (e.g., confirmation or denial of a prediction result, user information such as name, credential, or other user profile data, etc), algorithms, and the like. In certain embodiments, one or more of the local databases may be co-located with the edge computing device (e.g., base analytics module), may be co-located with one another on the local network, or may be located separately from other local devices. One of ordinary skill will recognize that the disclosed embodiments are not limited to the configuration and/or arrangement of the database(s).

The local database 226 may be one or more memory devices configured to store data. The database 226 may be local to the base station and/or onboard the mobile safety system. In some cases, the database may be a time-series database that is configured for handling time series data, arrays of numbers indexed by time (e.g., a date-time or a date-time range). Additionally, the databases may also, in some embodiments, be implemented as a computer system with a storage device. In one aspect, the databases such as the local database and cloud databases may be used by components of the multimodal safety system to perform one or more operations consistent with the disclosed embodiments. One or more cloud databases and local database of the platform may utilize any suitable database techniques. For instance, structured query language (SQL) or "NoSQL" database may be utilized for storing the data transmitted from the edge computing system or the local network such as real-time data (e.g., location data, motion data, audio/video data, messages, etc.), processed data such as report, alert, historical data, predictive or detective model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some cases, batch data, and/or individual records, report and the like may be generated by the edge computing device (e.g., edge computing module 216, base analytics module 223). Some of the data may be stored in the local database 226, while some of the data may be transmitted to a remote cloud.

The remote cloud (e.g., cloud 150 in FIG. 1) may comprise one or more cloud applications such as a management console or cloud analytics portal that can be accessed by superintendents, managers, directors, auditors or third-party entities. For example, upon detection of a safety infraction or security event, individuals may be immediately notified via haptic feedback on their personal alert device (e.g., wearable device, mobile tag device, etc.). Alert video and metadata may be simultaneously sent to a safety manager portal of the management console for post-event analysis and coaching. The analytics portal may deliver continuous safety data to help recognize improvements on individual behavior and operations management, as well as maintenance of devices, applications running on the edge computing server and on the cloud. Third-party entity may access the cloud data repository or cloud applications for various purposes such as internal auditors, construction site state control inspection and various others.

Data captured by the multimodal sensory systems, wearable device, user devices, as well as real-time feedback data and management data may be communicated via a network architecture well-suited for use in a dynamic environment. In some cases, the network architecture may comprise a local network that is within the worksite. The local network may employ a topology or configuration capable of operating in dynamically changing or challenging environments where obstructions or distance prevent wireless communication from a device to a hub. For example, the local network may employ industrial grade WiFi Mesh technology providing stronger and more reliable Wi-Fi signals. Alternatively, or in addition to, the local network may be a mesh network where devices communication with each other without a centralized device, such as a hub, switch or router.

In some embodiments, the network architecture may comprise interconnect infrastructure or fabric such as purpose-built hardware, herein referred to as "gateways," which are compatible with a wireless protocol. The local network may have a dynamic configuration that is changing with the location of the mobile safety system. In some cases, an edge computing device (e.g., base analytic module, edge analytic module) onboard a mobile safety system may be in communication with sensors of another mobile safety system. The real-time sensor data may be transmitted to one or more edge computing devices for analysis.

In some cases, at least one of the mobile safety systems may be in communication with a remote cloud/data center through the gateways for downloading trained predictive or detective models, and transmitting data such as report data (e.g., incident report, data collected from the multimodal sensory system, etc.) and various others for further analysis and management. For instance, sensor data stream may be transmitted to the edge computing device in real-time for managing worksite operations, safety and risk, whereas a message package comprising batch data may be sent to the cloud at a lower frequency.

The communication module 222, 215 may include a wireless interface. For example, the communication module may communicate using various modes or protocols, including but not limited to GSM voice calls, messaging protocols (such as SMS, EMS, or MMS messaging), CDMA, TDMA, PDC, WCDMA, CDMA2000, GPRS, 4G protocols (such as 4G LTE), 5G protocols, and/or other appropriate protocols. Such communication may occur, for example, through one or more radio-frequency transceivers. In addition, short-range communication may occur, such as using a Bluetooth, Wi-Fi, and/or other such transceivers. The communications module may communicate messages using one or more networks or communication links, such as one or more cellular or other phone-based networks, over remote control radio frequency links, UHF or L-band frequency links, microwave frequency links, the Internet, the "cloud" or one or more networks providing access to the Internet or the cloud, one or more mesh networks, local or wide-area networks, a microwave network, a radio frequency network, or other appropriate datalinks or networks, a public network and/or a private network, or other appropriate datalinks, networks, or communication paths. The communication module may comprise antenna(s) that can be configured for either LoRa (long range wide area network, such as in accordance with the LoRa Alliance), FSK (frequency shift keying), GFSK (Gaussian frequency shift keying), OOK (on-off keying) modulation, or any low power wide area network modulation techniques.

In some embodiments, the local network may comprise a WiFi-beacon configuration. For example, the network configuration may comprise one or more WiFi Mesh access points and one or more beacons deployed within the worksite. The network of devices may be deployed to provide full network coverage at the worksite. In some cases, the deployment of the network devices may be determined based on the layout (e.g., indoor/outdoor layout) of the worksite, safety zone or work zone (e.g., location where tasks to be performed) such that a reliable network coverage is provided in the workplace. The plurality of sensors and/or mobile tag devices carried by the individuals or an equipment may be in communication with the edge computing device and/or a remote entity (e.g., cloud) via the wireless network. In some cases, the local network may comprise a communication unit such as a WiFi controller or switch responsible for deciding a data path or data link according to a routing table. The network may also comprise a gateway connecting the local network to a remote network or network entity (e.g., cloud). The gateway device may provide long range RF wireless coverage (e.g., DLPWAN) to connect the local network. The gateway devices may allow long range communications. In some cases, the long-range RF wireless coverage may be a narrowband wireless network coverage. In some cases, the gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and, various other data transmission methods. In some cases, the gateway devices may switch power amplification, bandwidth, and/or bitrate in real-time to optimize for signal quality, transmission rate, and/or battery life.

In some cases, the communication module 215, 222 may include a gateway connecting to a wide area network (e.g., Internet) or cloud using any TCP/IP or UDP-based capable backhaul, such as Ethernet, Wi-Fi or cellular 4G or 5G. The gateway may contain a radio frontend capable of listening to several MHz of RF wireless spectrum at a time, and/or configured to hear all network traffic transmitted within that spectrum. In some cases, the gateways may use synchronized frequency hopping schemes.

In some embodiments, the communication module 215, 222 may also comprise a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons that transmit a continuous stream of packets that are picked up by a BLE sensor on the mobile device or the wearable device.

The network configuration may be dynamically changing. For example, one or more of the network devices may be carried by the plurality of platforms comprising mobile safety system and a geo-location of the network devices may change within the worksite. In another example, the network topology may be dynamically changing. In some cases, the local network may be a mesh network. In a mesh network, devices communication with each other without a centralized device, such as a hub, switch or router. In some cases, the network may be connected to a mesh network formed by a plurality of the sensors, mobile tag devices, or the wearable devices. The wireless mesh network may employ any suitable protocol, such as Wi-Fi, Bluetooth, BLE, Bluetooth Mesh, ZigBee, body area network (BAN), IrDA, ultra wide band (UWB), etc. For example, a Wi-Fi mesh network may be used to facilitate data transfer between the plurality of sensors and wearable devices. Sensory data collected by mobile safety systems located at different places may be transferred by hopping from one mobile safety system to another until it reaches a destination (e.g., a local control unit, a central device, user device, gateway, etc.) according to a predetermined protocol across the mesh network. In some cases, a mobile safety system in the mesh network may comprise a communication unit such as a Wi-Fi controller responsible for deciding a data path or data link according to a routing table. The mesh network may be low power consumption.

The mesh network may be robust and reliable when a mobile platform is added or removed from the mesh network. A configuration of the mesh network may be configured to automatically adapt to an addition or removing of a mobile platform of the network. In some cases, the formation of a mesh network may not require a human set up. For example, once a mobile platform moves to a desired location where a plurality of platforms comprising the mobile safety system have been deployed earlier, the communication module may be automatically detected and become part of the mesh network. For instance, the communication module may check its routing table and other communication modules in proximity to decide a data transfer path.

In some embodiments of the base station, a detector 225 is employed to provide secured deployment or prevent the mobile safety system from tampering. For example, the detector 225 may secure the base station to the mobile platform and may be capable of detecting unauthorized removal of the components of the mobile safety system. Any suitable anti-tampering techniques may be employed to detect the tampering. For example, the detector may include an IR LED emitter and photodiode detector to detect whether a component of the system is in place. In another example, the detector may include an integrated proximity-based sensor for detecting tampering.

Multimodal Sensor Fusion

An aspect of the present disclosure provides multimodal sensor fusion. The provided multimodal safety system may be capable of taking advantage of the complimentary properties of the individual sensor modalities to increase the accuracy or to reduce the computational cost in different deployment environments, or worksites, or conditions over time. In particular, one or more trained predictive or detective models employing the computer vision system, the RTLS and LIDAR system may be dynamically adjusted and tuned to adapt to different individuals, different deployment environment, or different worksites conditions over time with continual training or retraining. In some cases, one or more predictive or detective models utilized by the multimodal sensor fusion may be continuously updated/re-trained without human intervention.

In some cases, the one or more trained predictive or detective models employing the computer vision system, the LIDAR system or the RTLS may be dynamically adjusted and tuned to adapt to the individuals, deployment environment, or worksites conditions over time with continual training or retraining performed at the cloud.

In some cases, the one or more predictive or detective models may be trained, developed, updated, and managed by a management system. In some cases, the management system may perform continual training or improvement after deployment. In some cases, the predictive or detective model utilized by the multimodal sensor fusion may be improved or updated continuously over time (e.g., during implementation, after deployment). Such continual training and improvement may be performed automatically with little user input. The management system can be applied in various scenarios such as in cloud or an on-premises environment.

Figure 3:
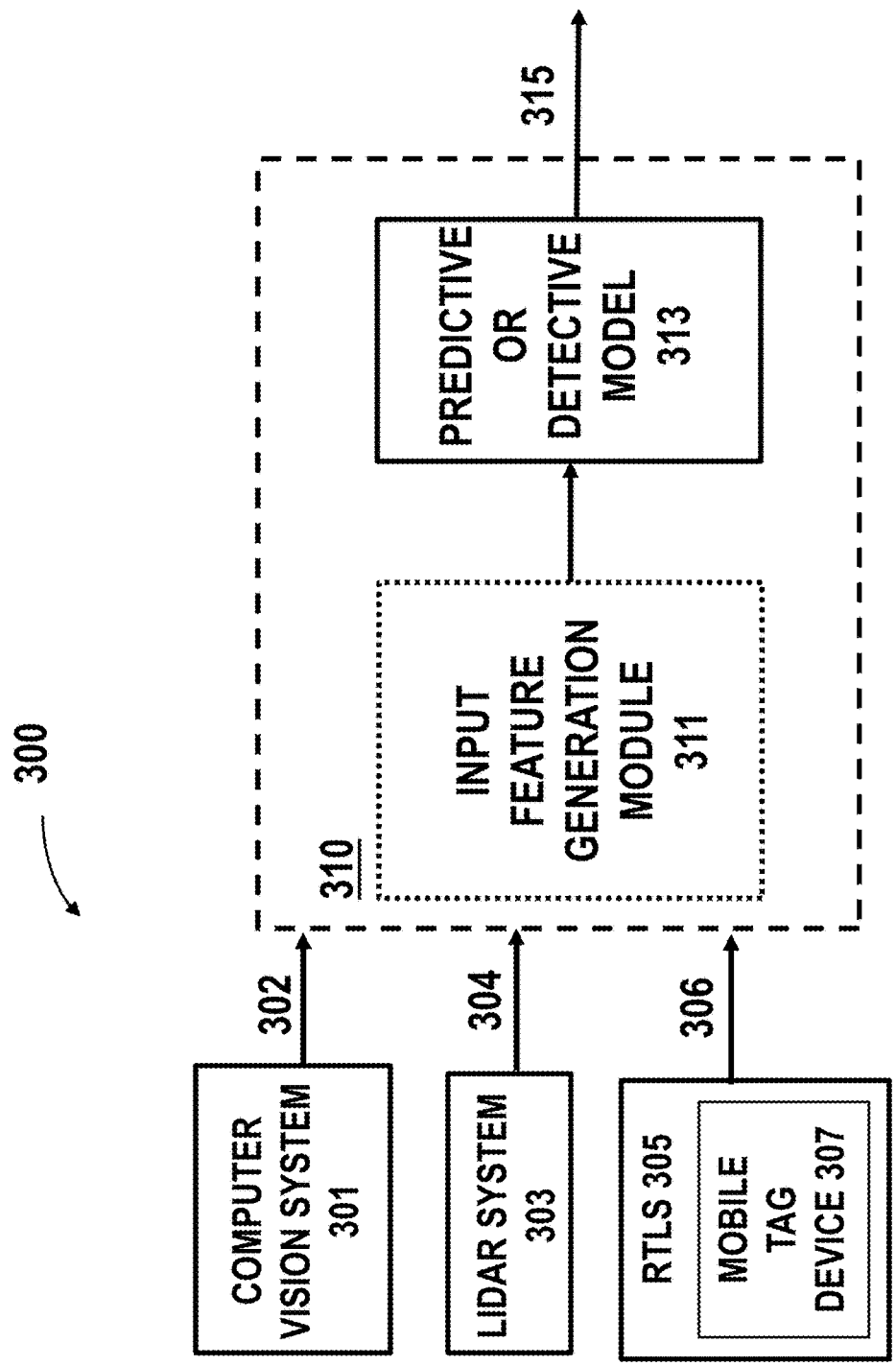
FIG. 3 schematically shows a block diagram of multi-modal sensor fusion, in accordance with some embodiments of the present disclosure.

FIG. 3 schematically shows a block diagram of a multimodal sensor fusion 300, in accordance with some embodiments of the present disclosure. The multimodal sensor fusion 300 may be configured to process multimodal sensory data to generate an output for safety purpose. In some embodiments, the multimodal sensory data may be collected from a computer vision system 301, a LIDAR system 303 and a RTLS system 305, and processed by an intelligent safety inference engine 310 to produce an output 315. In some cases, the multimodal sensory data may further include data collected from one or more sensors (e.g., IMU, motion sensors, etc.) of the mobile tag device 207 for detecting a position, orientation or motion state (e.g., speed, acceleration, etc.) of an individual who wears the mobile tag device or a movable object carries the mobile tag device.

In some embodiments of the multimodal safety system, the predictive or detective model utilized by the computer vision system 301, the LIDAR system 303 or the inference engine 310 may be continuously updated and tuned using newly collected data (e.g., raw sensor data, output of the multimodal sensor suite).

In some embodiments, the output 315 of the safety inference engine 310 may include safety related results such as a detected or predicted accident or adverse event within the target scene (e.g., construction site). The safety related results may include, but not limited to, detection of an incident (e.g., trip, slip, fall), detection of impeding collision, detection of a crime or security event, detection of fatigue level, predicting/forecasting a hazardous zone or condition and various others. As an example, the output may be detection and tracking of a large piece of moving equipment, such as a crane with a variable three-dimensional shape and orientation in space relative to other objects present in the target scene, including workers wearing mobile tags, other mobile and stationary equipment, and the building structures that have no tags attached thereto.

In some cases, the output 315 may cause action such as an alert, warning, guidance delivered to the associated individual via the wearable device or mobile tag device. For example, action may include warnings about a hazardous condition on a worksite which can be generated and delivered to the individual prior to the individual entering the hazardous work zone or to warn the individual about a collision event. In some cases, an impeding hazardous event or hazardous condition may be predicted or forecasted. For example, the safety inference engine may be capable of forecasting an impeding adverse event a certain timespan before the occurrence of the event. The forecasting or prediction of an impending adverse event may be generated using a trained model.

In some embodiments, a warning signal and interventions can be proactively suggested. For example, the output 315 may further include interventions delivered to the associated individual or control signals to an equipment. For instance, the interventions to the workers may comprise workflow or operations instructions/guidance to a worker, training or coaching, navigational information to guide the worker within a construction site and the like. The interventions to the machines or equipment in a worksite may include, for example, control signals to the equipment to shut down or change a machine state of the equipment to avoid collision or other hazardous events. Control signals to the equipment may be delivered as commands to PLC (programmable logic controller) which controls the equipment.

The output 315 may be generated by the safety inference engine 310. In some embodiments, the safety inference engine 310 may include an input feature generation module 311 and a trained predictive or detective model 313. For example, the detection of an incident (e.g., trip, slip, fall, collision), detection of behavior not in compliance with safety protocol (e.g., not wear PPE), detection of fatigue level, predicting a hazardous zone or condition may be provided using the predictive or detective model 313. A predictive or detective model may be a trained model or trained using machine learning algorithm. The machine learning algorithm can be any type of machine learning network such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.). The predictive or detective model may be trained, developed, continual trained-retrained by a model creation and management system as described elsewhere herein.

The input feature generation module 311 may generate input feature data to be processed by the trained predictive or detective model 313. In some embodiments, the input feature generation module 311 may receive data from the computer vision system 301, the LIDAR system 303, and the real-time locating system 305, extract features and generate the input feature data. In some embodiments, the data 302, 304, 306 received from the computer vision system, the LIDAR system, and the RTLS may include raw sensor data (e.g., image data, LIDAR data, time-series location data, identity data, IMU data, etc.). In some cases, the input feature generation module 311 may pre-process the raw sensor data (e.g., data alignment, data registration, image registration, etc.) generated by the multiple different sensory systems (e.g., sensors may capture data at different frequency, different viewpoints/angles/field of views, etc.) or from different sources (e.g., third-party application data). For example, data captured by camera, LIDAR, RTLS and telemetry data (e.g., temperature, physiologic data, IMU data, etc.) may be aligned with respect to time and/or identification (e.g., device ID, worker ID, equipment ID, etc.). This may beneficially allow least some of the functionalities of the CV system to be replaced by or supplemented by the RTLS or LIDAR system. For instance, accuracy and efficiency of detecting and identifying objects in the scene via computer vision may be advantageously complemented by utilizing the location data of such objects and the object identities as provided by the RTLS. For example, the identity of a person wearing a tag in the field of view may be determined based on the mobile tag ID without performing CV techniques to detect the person or perform facial recognition from captured image. In another example, the identity of an equipment may be determined based on the mobile tag ID without performing object recognition techniques (i.e., CV techniques). In some cases, spatial alignment may be performed to align the multiple types of sensor data. For example, 3D point clouds data generated by the LIDAR system, and the object identity and location data or motion data generated by the RTLS component may be registered to the 3D scene map generated by the computer vision system. The data/image registration may be performed using various suitable methods such as intensity-based or feature-based methods, methods based on known transformation models, similarity features-based method, and various other methods. In some cases, the identification information from the RTLS may be used as the ground truth data for training a model to recognize an object from the camera image (CV model).

The data 302 generated by the computer vision (CV) system 301 may include descriptions of the target scene (e.g., construction site) such as object detection, 3D scene map, object classification, extraction of the scene depth and estimation of relative positions of objects, extraction of objects' orientation in space, anomaly detection, detection of an unsafe situation, or other descriptions. In some cases, the data 302 provided by the computer vision system may be generated using an optical technique that may not be as computationally expensive as using the computer vision system alone. At least some of the functionalities of the computer vision system can be replaced by or supplemented by the RTLS or LIDAR system. For instance, accuracy and efficiency of detecting and identifying objects in the scene via computer vision may be advantageously complemented by utilizing the location data of such objects and the object identities as provided by the RTLS. For example, the identity of a person wearing a tag in the field of view may be determined based on the mobile tag ID without performing CV techniques to detect the person or perform facial recognition from captured image.

The computer vision system 301 may adopt any suitable optical techniques to generate the computer vision (CV) output data 302 (e.g., 3D or depth information of the target scene). For example, the CV output data may be generated using passive methods that only require images, or active methods that require controlled light to be projected into the target scene. Passive methods may include, for example, thermal image acquisition, object recognition, stereoscopy, monocular depth-from-motion, shape-from-shading, and Simultaneous Localization and Mapping (SLAM) and active methods may include, for example structured light and Time-of-Flight (ToF). In some cases, computer vision techniques such as optical flow, computational stereo approaches, iterative methods combined with predictive or detective models, machine learning approaches, predictive filtering or any non-rigid registration methods may be used to generate the descriptions of the 3D scene.

The optical techniques may employ one or more trained predictive or detective models to generate the output data 302. The one or more predictive or detective models can be trained using any suitable deep learning networks. For example, the deep learning network may employ U-Net architecture which is essentially a multi-scale encoder-decoder architecture, with skip-connections that forward the output of each of the encoder layers directly to the input of the corresponding decoder layers. As an example of a U-Net architecture, upsampling in the decoder may be performed with a pixel shuffle layer which may help reducing gridding artifacts. The merging of the features of the encoder with those of the decoder may be performed with pixel-wise addition operation resulting in a reduction of memory requirements. The residual connections between the central input frame and the output may be introduced to speed up the training process.

The deep learning model can employ any type of neural network model, such as a feedforward neural network, radial basis function network, recurrent neural network, convolutional neural network, deep residual learning network and the like. In some embodiments, the deep learning algorithm may be convolutional neural network (CNN). The model network may be a deep learning network such as CNN that may comprise multiple layers. For example, the CNN model may comprise at least an input layer, a number of hidden layers and an output layer. A CNN model may comprise any total number of layers, and any number of hidden layers. The simplest architecture of a neural network starts with an input layer followed by a sequence of intermediate or hidden layers, and ends with an output layer. The hidden or intermediate layers may act as learnable feature extractors, while the output layer may output the improved image frame. Each layer of the neural network may comprise a number of neurons (or nodes). A neuron receives input that comes either directly from the input data (e.g., low quality image data etc.) or the output of other neurons, and performs a specific operation, e.g., convolution. In some cases, a connection from an input to a neuron is associated with a weight (or weighting factor). In some cases, the neuron may sum up the products of all pairs of inputs and their associated weights. In some cases, the weighted sum is offset with a bias. In some cases, the output of a neuron may be gated using a threshold or activation function. The activation function may be linear or non-linear. The activation function may be, for example, a rectified linear unit (ReLU) activation function or other functions such as saturating hyperbolic tangent, identity, binary step, logistic, arcTan, softsign, parameteric rectified linear unit, exponential linear unit, softPlus, bent identity, softExponential, Sinusoid, Sinc, Gaussian, sigmoid functions, or any combination thereof. During a training process, the weights or parameters of the CNN are tuned to approximate the ground truth data thereby learning a mapping from the input raw image data to the desired output data (e.g., identity of object, location, orientation of an object in a 3D scene).

In some embodiments, the deep learning model may be trained using supervised learning or semi-supervised learning. For example, in order to train the deep learning network, pairs of datasets with input image data (i.e., images captured by the camera) and desired output data (e.g., ground truth/label) may be generated by a training module of the system as training dataset. The deep learning model may be retrained after deployment to adapt to recent and new changes in an environment.

The LIDAR (light detection and ranging) system 303 may obtain three-dimensional information of the target scene by measuring distances to objects. In some cases, the LIDAR system 303 may include one or more LIDAR devices for providing three-dimensional (3D) imaging (e.g., 3D point cloud) or perform further analysis (e.g., obstacles detection or collision avoidance).

The data 304 received from the LIDAR system may comprise LIDAR output data such as 3D point cloud data and/or analysis result (e.g., detection of an obstacle, detection of a collision, etc.). The LIDAR system 303 can be the same as the LIDAR component as described in FIG. 1. In some cases, the analysis performed by the LIDAR system (e.g., obstacle detection, collision detection) may employ one or more predictive or detective models. The predictive or detective models may be trained using supervised learning. For example, in order to train the deep learning network, pairs of datasets with input 3D point cloud data and desired output data (i.e., ground truth/label data) may be generated by a training module of the management system as training dataset.

The RTLS 305 may generate RTLS output data 306 by processing the radio signals as described above using one and some combination of ranging and/or angulating methods to determine location. The ranging and/or angulating methods may include, for example, angle of departure, line-of-sight, time of arrival, time difference of arrival, two-way ranging, symmetrical double sided two way ranging, near-field electromagnetic ranging or other methods as described in FIG. 1. The RTLS 305 can be the same as the RTLS component as described in FIG. 1. For example, the RTLS may include a plurality RTLS reference points devices (e.g., transmitters, receivers, transceivers), deployed throughout the target scene to provide the desired mobile tag coverage as well as a plurality of mobile tags attached to the individuals and/or equipment (e.g., vehicles, machines, asset, etc.) within the scene.

The RTLS may include a plurality of mobile tag devices 307. The mobile tag device can be the same as the mobile tag device as described in FIG. 1. For example, the mobile tag device 307 may comprise one or more sensors for detecting a position, orientation or motion state (e.g., speed, acceleration, etc.) of an individual who wears the mobile tag device or a movable object carries the mobile tag device. Such sensor data may provide an additional modality to the multimodal sensory system. The one or more sensors may include at least an inertial measurement member. The inertial measurement member may comprise one or more gyroscopes, velocity sensors, accelerometers, magnetometers, and one or more location sensors as described elsewhere herein.

In some embodiments, the RTLS output data 306 may comprise at least time-series of location data (e.g., proximity data), identification data (e.g., device ID, worker ID, equipment ID, etc.) and the motion data (e.g., IMU data). In some cases, the RTLS output data 306 may be captured at the same frequency and/or time points as capturing the image data by the CV system or the LIDAR system (e.g., same time stamp). Alternatively, the RTLS output data 306 may not be captured at the same frequency or at the same timepoints to the CV system or LIDAR system sensor data, techniques such as interpolation or data registration may be utilized to align the different types of data.

The functions, methods or the one or more components described (e.g., input feature generation module, inference engine) may be implemented using software, hardware or firmware or a combination thereof. For example, the components may comprise one or more processors and at least one memory for storing program instructions. As used herein a processor encompasses one or more processors, for example a single processor, or a plurality of processors of a distributed processing system for example. A controller or processor as described herein generally comprises a tangible medium to store instructions to implement steps of a process, and the processor may comprise one or more of a central processing unit, programmable array logic, gate array logic, or a field programmable gate array, for example. In some cases, the one or more processors may be a programmable processor (e.g., a central processing unit (CPU) or a microcontroller), a graphic processing unit (GPU), digital signal processors (DSPs), a field programmable gate array (FPGA) and/or system on chip (SoC). In some cases, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random-access memory (RAM)). One or more methods, algorithms or operations disclosed herein can be implemented in hardware components or combinations of hardware and software such as, for example, ASICs, special purpose computers, or general-purpose computers.

Edge Computing Platform

In an aspect of the present disclosure, a safety platform is provided for generating real-time feedback, controlling workflow, detecting, predicting and managing risks in a workplace, and managing predictive or detective models deployed to one or more mobile safety systems. In some cases, the safety platform may include a backend management system for training one or more predictive or detective models. In some cases, the backend management system may perform continual training or improvement after deployment. In particular, the predictive or detective model utilized by the computer vision system or safety inference engine may be dynamically adjusted and tuned to adapt to different individuals, different deployment environment, or different worksites conditions over time with newly collected data. In some cases, one or more predictive or detective models utilized by the multimodal sensor fusion may be continuously updated/re-trained without human intervention. The safety management platform may also allow remote supervisors and managers, or remote entities to monitor adverse event occurrence. The backend management system can be applied in various scenarios such as in cloud or an on-premises environment.

Figure 4:
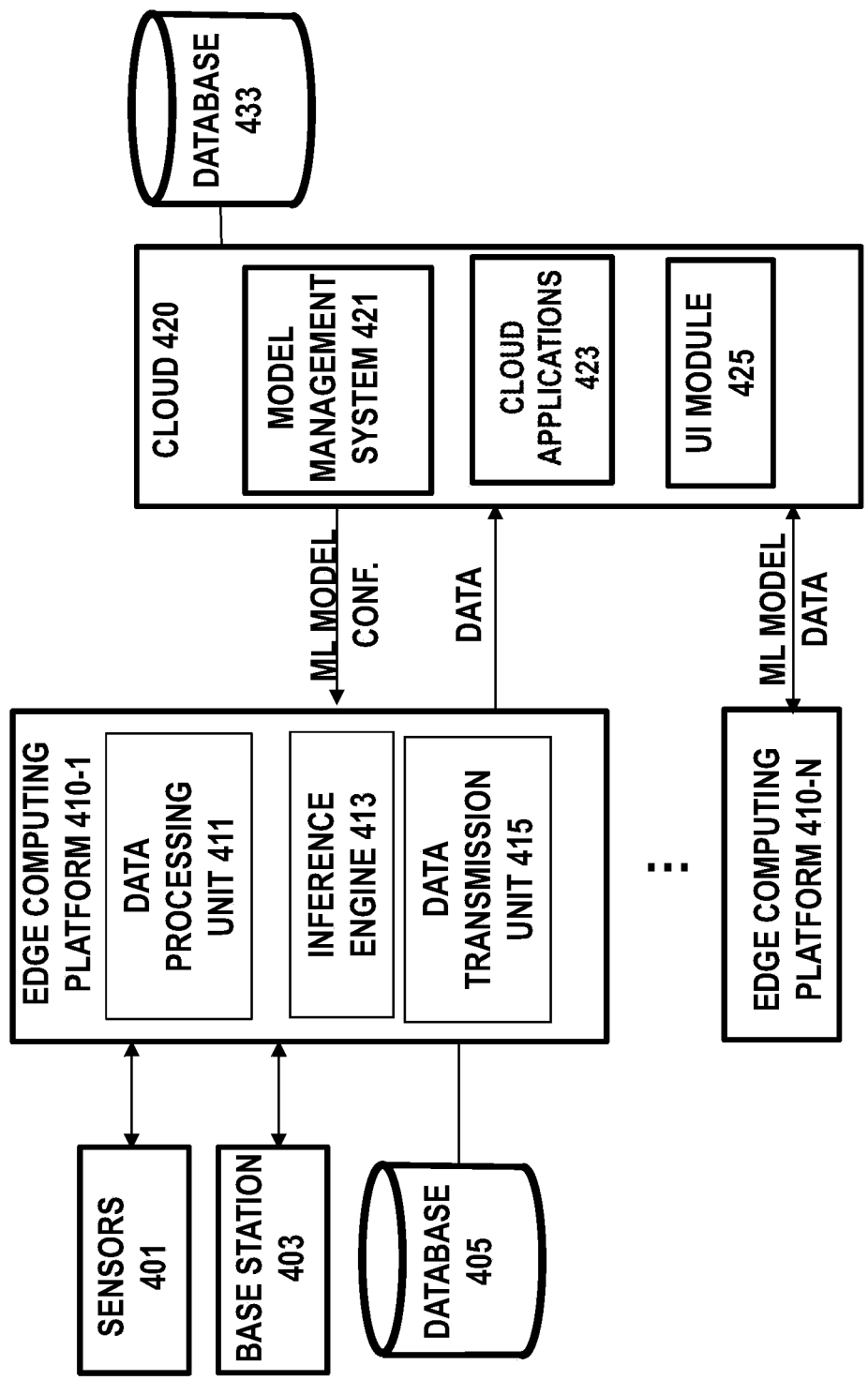
FIG. 4 schematically shows one or more edge computing platforms in communication with a cloud platform, in accordance with some embodiments of the present disclosure.

FIG. 4 schematically shows an edge computing platform 410-1, 410-N in communication with a cloud platform 420, in accordance with some embodiments of the invention. The edge computing platform 410-1, 410-N may run on an edge gateway or edge device that is located on a mobile safety system. In some embodiments, the edge computing platform may comprise a data processing unit 411, inference engine 413, and a data transmission unit 415. The sensors 401 can include the multimodal sensory systems (e.g., camera, LIDAR, RTLS transceiver, etc.), sensors located at the base station (e.g., GPS) or sensors on the mobile tag device, or user devices.

The data processing unit 411 may provide pre-processing of stream data and batch data collected from the sensors 401 and/or base station (e.g., multimodal sensory devices, user devices, GPS) and other devices connected to the local network at the worksite. In some embodiments, the data processing unit 411 may support ingesting of sensor data into a local storage repository 405 (e.g., local time-series database), data cleansing, data enrichment (e.g., decorating data with metadata), data alignment, data annotation, data tagging, data aggregation, and various other data processing. Data from the user devices (e.g., dashboard tablet, mobile device, wearable device, etc.), multimodal sensor system, mobile tag device and various other sources as described elsewhere herein may be ingested and processed by the data processing module. The data provided or outputted by the sensors may be a binary data stream. The transmission or delivery of this data from the sensors to the data processing unit can be push or pull methods. In some cases, the data processing unit may enrich the incoming data from the sensors by decoding the raw binary data into consumable data formats (such as JavaScript Object Notation) and also decorating with additional necessary and useful metadata.

In some cases, the data processing unit 411 may be configured to pre-process continuous streams of raw data or batch data transmitted from the local network and prepare the data to be processed by the inference engine 413. Data processing may include, for example, data normalization, labeling data with metadata, tagging, data alignment, data segmentation, and various others. In some cases, the data processing module 411 may perform operations same as those performed by the input feature generation module as described in FIG. 3. For instance, data from the multimodal sensory systems may be processed so it can be fed into a trained CNN model. In some cases, the processing methodology may be programmable through APIs by the developers constructing the machine learning analysis via the cloud applications or the UI portal 425.

The data processing module 411 may process the real-time data collected at the edge device or mobile safety system before sending to the cloud. In some cases, at least a portion of the pre-processed data may be transmitted to the cloud for training or updating a model. In some cases, the data processing module 411 may be coupled to the communication module 415 to prepare the data for transmission based on a transmission scheme. For example, the data processing module 411 may also be configured to aggregate the raw data across a time duration (e.g., about 1, 2, 3, 4, 5, 6, 7, 8, 9, 10 seconds, about 1, 2, 3, 4, 5, 6, 7, 8, 9, 10 minutes, about 1, 2, 3, 4, 5, 6, 7, 8, 9, 10 hours, etc.), across data types (e.g., accelerometer data, physiological data, location data, audio data, video data, user input, image data, etc.) or different sources, and send the aggregated data to a remote entity 420 (e.g., cloud) as a package.

The inference engine 413 can be the same as the safety inference engine as described in FIG. 3. In some cases, the inference engine 413 may process real-time data generated by the multimodal sensory systems, the user devices (e.g., dashboard tablet, mobile device, etc.), sensors, wearable device, mobile tag device using one or more predictive or detective models. Similarly, the one or more predictive or detective models can be downloaded from the cloud. The inference engine 413 may perform various functions such as generating preventive alerts and warnings, detecting worker-based metrics (e.g., fatigue level, health condition, under-stress, physiological state, etc.), detecting an incident (e.g., trip, slip or fall), predicting an impeding adverse event (e.g., hazardous condition forecasting, identifying a hazardous situation or conditions in a work zone, etc.), generating real-time interventions, and identifying an efficient workflow or tasks assignment for one or more workers and one or more groups.

The data transmission unit 415 may be connected to a storage location 425 in the cloud. The data transmission unit 415 may transmit processed data (e.g., aggregated data, batch processed data, safety related result, analytics data, etc.) to the cloud for further analysis. In some cases, the data transmission unit 415 may be configured to automatically transmit different data to different entities on the cloud according to a data delivery framework. The data delivery framework can be generated using machine learning techniques.

In some embodiments, the data transmission unit 415 may be connected to or include a communication module. The communication module can be the same as the communication module as described in FIG. 1 or FIG. 2. For example, the communications module may communicate using various modes or protocols, including but not limited to GSM voice calls, messaging protocols (such as SMS, EMS, or MMS messaging), CDMA, TDMA, PDC, WCDMA, CDMA2000, GPRS, 4G protocols (such as 4G LTE), 5G protocols, and/or other appropriate protocols. Such communication may occur, for example, through one or more radio-frequency transceivers. In addition, short-range communication may occur, such as using a Bluetooth, Wi-Fi, and/or other such transceivers. The communications module may communicate messages using one or more networks or communication links, such as one or more cellular or other phone-based networks, over remote control radio frequency links, UHF or L-band frequency links, microwave frequency links, the Internet, the "cloud" or one or more networks providing access to the Internet or the cloud, one or more mesh networks, local or wide-area networks, a microwave network, a radio frequency network, or other appropriate datalinks or networks, a public network and/or a private network, or other appropriate datalinks, networks, or communication paths. The communication module may comprise antenna(s) that can be configured for either LoRa (long range wide area network, such as in accordance with the LoRa Alliance), FSK (frequency shift keying), GFSK (Gaussian frequency shift keying), OOK (on-off keying) modulation, or any low power wide area network modulation techniques.

In some embodiments, the data to be transmitted may be dynamically determined based on the available communication modes or methods. The mobile safety system may monitor the available communication modes or methods, and/or their parameters (e.g., available bandwidth, security, robustness, etc.), in real-time, for example. In some instances, the mobile safety system may monitor the available communication modes or methods, and/or their parameters, periodically. Based on the available communication modes or methods, the system may select the communication mode or method to use, the type of data to transmit, quality of data, frequency of data transmission, and the like. For instance, when the available bandwidth is limited, selected or critical data may be transmitted, whereas when greater bandwidth is available, data streams (e.g., video data) which require greater higher data rate or bandwidth usage may be transmitted. In an example, when Long Range Radio (LoRA) or Satellite communications is the only available communication method, due to the limited transmission bandwidth, critical data such as an alert or warning indicating a type of detected emergency or basic data such as GPS location may be transmitted. Such limited data may be transmitted at the detection of an event or at pre-determined time points. In another example, when a medium bandwidth transmission mode is available (e.g., mesh networking), sensor data including environment condition, location of equipment on the site, warnings, the location of workers or materials and the like may be transmitted, and such sensor data may be broadcasted constantly. In a further example, when a transmission mode with greater bandwidth is available (e.g., 3G, 4G, LTE, or 5G cellular networking), sensory data streams may be transmitted or broadcasted constantly. In the case when WiFi is available, data streams (e.g., video data) that require higher data rate or bandwidth usage may be transmitted live.

In some embodiments, the communication modes/methods/protocols, or the data to be transmitted may be dynamically selected based on available wireless resources, signal strength and the like. For example, the LoRa PHY link RF transmit power, bandwidth (BW), and spreading factor (SF) can be dynamically controlled in software to minimize power consumption and maximize range capability without the need to change hardware configuration. In some embodiments, this dynamic control can be based on a GPS location of the communication module, received-signal-strength indicator (RSSI), signal-to-noise ratio (SNR), packet error rate (PER), and/or channel activity detection (CAD).

In some cases, data may be transmitted from the edge computing platform to the cloud according to a transmission scheme. In some cases, the transmission scheme may specify which of the local data (e.g., processed data, raw sensor data, etc.) or which portion of the local data to be moved/transmitted to the cloud. The transmission scheme may also specify a communication protocol, compression or encryption method used for transmission, which of the local data or which portion of the local data is to be communicated to which data center, a cloud database or third-party entity, when and at what frequency this portion of data is transmitted. For example, a data transmission scheme may comprise timing of transmission such as delay time or frequency, and various others (e.g., regulatory rules regarding privacy before data is transmitted). For instance, based on the available communication method, a data transmission scheme may be generated by a predictive model and selected data may be transmitted based on the transmission scheme. Alternatively, or in addition to, the data transmission scheme may be determined based on a set of rules. The set of rules may be handcrafted rules. For example, pre-determined or hand-crated rules may be applied to determine a compression method and/or encryption method for a transmission, or what type of data to be transmitted based on the available communication method.

The edge computing platform 410-1, 410-N may be used to manage or configure the sensors 401 or the base station 403. For example, the edge computing platform may send sensor configuration and/or control messages to the base station 403 or the connected sensors 401. The edge computing platform may be implemented in software, hardware, firmware, embedded hardware, standalone hardware, application specific-hardware, or any combination of these. An edge computing platform 410-1,410-N may also control one or more other components of the mobile safety system such as motion of the support assembly, position or orientation of the distal end of the support assembly, and the like.

In some cases, the remote entity (e.g., cloud) 420 may include services or applications that run in the cloud or an on-premises environment to remotely configure and manage one or more mobile safety systems or edge computing platform 410-1, 410-N deployed to a worksite or multiple worksites. In some embodiments, the remote entity may host a plurality of functional components such as a model management system 421, one or more cloud applications 423, a user interface module 425 or other components.

In some cases, the cloud applications 423 may process or analyze data transmitted from the local worksite (e.g., construction site) for various use cases. The cloud applications may, for example, allow for a range of use cases such as post-even analysis, internal auditors, construction site state control inspection or management, and the like.

In some embodiments, cloud applications 423 may include management console or cloud analytics portal that can be accessed by remote superintendents, managers, or third-party entities. In some cases, the management console may allow users to manage deployment of the mobile safety systems, the groups of workers, and analytics received from a plurality of different worksites. In some cases, the analytics received from a plurality of different worksites may be analyzed to extract patterns for improving performance of predictive or detective models.

In some embodiments, the remote entity 420 may host or comprise a model management system 421 for training, developing, deploying and managing predictive or detective models. In some cases, the model management system may comprise a model creator and a model manager. In some cases, a model creator may be configured to train, develop or test a predictive or detective model using data from a cloud data lake (e.g., database 433) and/or metadata database that stores contextual data (e.g., deployment context).

The model manager may be configured to manage data flows among the various components (e.g., cloud data lake 433, metadata database, local database 405, edge computing system 410-1, model creator), provide precise, complex and fast queries (e.g., model query, metadata query), model deployment, maintenance, monitoring, model update, model versioning, model sharing, and various others. For example, the deployment context may be different depending on edge infrastructure (e.g., types of workplace, volume/area of worksite, applications onboard the edge infrastructure, construction site information, etc.) and the model manager may take into account the application manifest such as edge hardware specifications, deployment location, information about compatible systems, data-access manifest for security and privacy, emulators for modeling data fields unavailable in a given deployment and version management during model deployment and maintenance.

The edge intelligence paradigm may allow for data processing and inference performed at the edge or edge computing platform 410-1, 410-N while the models may be built, developed and trained on a cloud/data center 420, and run on the edge computing platform for inference. For instance, the multimodal sensory data stream may be processed by the edge computing system in real-time for detecting incident (e.g., trip, slip or fall), collision avoidance, predicting and forecasting hazardous situations (e.g., identifying hazardous work zone or environmental conditions, etc.), identifying individual's physiological condition (e.g., fatigue, health condition, etc.), managing worksite operations, safety and risk, whereas a message package comprising batch data (raw sensor data or processed data) or incident report may be sent to the cloud 420 at a lower frequency.

In some embodiments, the model can be the same as the safety inference engine as described in FIG. 3. In some cases, the predictive or detective model of the safety inference engine for detecting an adverse event or predicting hazardous condition may be pre-trained on the cloud and transmitted to the edge computing platform for implementation. In some cases, the predictive or detective model may go through continual training as new sensor data and user feedback are collected. The continual training may be performed on the cloud or on the server 420. In some cases, sensor data may be transmitted to the cloud 420 which are used to update the model for continual training and the updated model (e.g., parameters of the model that are updated) may be downloaded to the local or edge computing system (e.g., user device, software application of the on-site system) for implementation.

In some cases, the cloud or data center 420 may further comprise a user interface (UI) module 425 for viewing analytics, reports, sensor data (e.g., image), and/or processed data. In some cases, the UI may also include a management UI for developing and deploying analytics expressions, deploying trained models to the edge (e.g., edge gateway, mobile safety system, safety inference engine, etc.) for inference, or configuring and monitoring the edge computing system. For example, the management UI may include a dashboard view of recently detected events, along with statistics for the day, week, month, or other time scale. A user may click a given event to view more details such as the identity of the worker, event type, and time and location of the event. Alternatively or in addition to, the analytics result may be displayed on a virtual map of the worksite within a graphical user interface (GUI).

In some cases, the graphical user interface (GUI) or user interface provided by the UI module 425 may be provided on a display of a user device. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through a mobile application or cloud application (e.g., via an application programming interface (API) executed on the manager's user device). Similarly, a GUI may also be provided by the edge computing platform and the GUI may be provided on a display of the wearable device, personnel device, mobile tag device, user device at the worksite. The GUI may be rendered through an application (e.g., via an application programming interface (API) executed on the wearable device, personnel device, user device, local supervisor's user device, etc.)

In some cases, the cloud or data center 420 may include applications that allow for integrated administration and management, including monitoring or storing of data in the cloud database 433 or at a private data center. In some cases, the cloud or data center 420 may include validation system to verify the accuracy of the mobile safety system by collecting ongoing feedback from authorized users and managers of the system.

The cloud database 433 may be one or more memory devices configured to store data. Additionally, the databases may also, in some embodiments, be implemented as a computer system with a storage device. One or more cloud databases 433 of the platform may utilize any suitable database techniques as described above.

The cloud database 433 may comprise storage containing a variety of data consistent with disclosed embodiments. For instance, the databases may store, for example, selected real-time data transmitted form the local network (e.g., data collected from the user device, multimodal sensory systems, and wearable device), each individual's or worksite's historical data, training datasets, data about a model (e.g., parameters, hyper-parameters, model architecture, performance metrics, threshold, rules, etc), data generated by a model (e.g., intermediary results, output of a model, latent features, input and output of a component of the model system, etc.), incident report, record and user provided information (e.g., user information such as name, credential, etc), safety law related data, algorithms, and the like. In certain embodiments, one or more of the databases may be co-located with the server 420, may be co-located with one another on the network, or may be located separately from other devices. One of ordinary skill will recognize that the disclosed embodiments are not limited to the configuration and/or arrangement of the database(s).

In some embodiments, the cloud 420 may construct the database 433 for fast and efficient data retrieval, query and delivery. For example, the cloud 420 may provide customized algorithms to extract, transform, and load (ETL) the data. In some embodiments, the management console residing on the cloud may construct the databases using proprietary database architecture or data structures to provide an efficient database model that is adapted to large scale databases, is easily scalable, is efficient in query and data retrieval, or has reduced memory requirements in comparison to using other data structures.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A mobile system for managing safety in an environment, comprising:
    a mobile platform configured to move the mobile system in the environment;
    a computer vision component for generating computer vision output data of the environment;
    a real-time locating component for generating location data about an object within the environment, the location data including identity of the object and location of the object within the environment, wherein the location of the object is determined based on location tracking performed by a mobile tag device carried by the object, further wherein the mobile tag identifies the object;
    a light detection and ranging (LIDAR) component for generating 3D point cloud data of the environment; and
    an edge computing device coupled to the computer vision component, the real-time locating component and the LIDAR component and configured to:
        (i) receive a data stream including the computer vision output data, the location data and the 3D point cloud data to generate an input feature dataset, wherein the generation of the input feature dataset includes use of complementary information in the location data, the computer vision data, and the 3D point cloud for multimodal sensor fusion, further wherein:
            the identity of the object depicted within the computer vision output data is determined based on the identity of the object and location of the object included in the location data; and
            the 3D point cloud and the location data are registered to a 3D scene map of the environment, the 3D scene map of the environment generated based on the computer vision output data; and
        (ii) process the input feature dataset using a machine learning algorithm trained model to generate a safety related result, wherein the safety related result indicates a detected or predicted adverse event involving the object and one or more other objects within the environment.

2. The mobile system of claim 1, further comprising a gateway device for establishing a connection with a cloud to download an updated machine learning algorithm trained model.

3. The mobile system of claim 1, further comprising a power source to power the computer vision component, the real-time locating component, the LIDAR component and the edge computing device.

4. The mobile system of claim 1, further comprising a detector for detecting an unauthorized removal of a component of the mobile platform.

5. The mobile system of claim 1, wherein:
the mobile tag device carried by the object further detects orientation, speed, or acceleration of the object;
the location data further includes the orientation, the speed, or the acceleration of the object; and
the input feature dataset is generated further based on the orientation, the speed, or the acceleration of the object.

6. The mobile system of claim 5, wherein the mobile tag device comprises a motion sensor.

7. The mobile system of claim 2, wherein the machine learning algorithm trained model is run on the edge computing device to locally generate the safety related result while the machine learning algorithm trained model is trained and updated on the cloud.

8. The mobile system of claim 1, wherein the machine learning algorithm trained model further generates a feedback data that is delivered to the object.

9. The mobile system of claim 8, wherein the safety related result includes a detection of an action of the object that does not comply with a safety protocol and the feedback data comprises an alert indicative of the detection delivered to the object via the mobile tag device.

10. The mobile system of claim 8, wherein the feedback data comprises a control signal to effect an operation of the object.

11. The mobile system of claim 1, wherein the computer vision output data comprises a description of the environment.

12. A method for managing safety in an environment using a mobile system, comprising:
generating, using a computer vision component of the mobile system, computer vision output data of the environment;
generating, using a real-time locating component of the mobile system, location data about an object within the environment, the location data including identity of the object and location of the object within the environment, wherein the location of the object is determined based on location tracking performed by a mobile tag device carried by the object, further wherein the mobile tag identifies the object;
generating, using a light detection and ranging (LIDAR) component of the mobile system, 3D point cloud data of the environment;
receiving, at an edge computing device located at the mobile system, a data stream including the computer vision output data, the location data and the 3D point cloud data to generate an input feature dataset, wherein the generation of the input feature dataset includes use of complementary information in the location data, the computer vision data, and the 3D point cloud for multimodal sensor fusion, further wherein:
the identity of the object depicted within the computer vision output data is determined based on the identity of the object and location of the object included in the location data; and
the 3D point cloud and the location data are registered to a 3D scene map of the environment, the 3D scene map of the environment generated based on the computer vision output data;
processing, by the edge computing device, the input feature dataset using a machine learning algorithm trained model to generate a safety related result, wherein the safety related result indicates a detected or predicted adverse event involving the object and one or more other objects within the environment; and
providing a mobile platform for moving the mobile system in the environment.

13. The method of claim 12, further comprising establishing, via a gateway device of the mobile system, a connection with a cloud to download an updated machine learning algorithm trained model.

14. The method of claim 12, further comprising detecting, with aid of a detector, an unauthorized removal of a component of the mobile platform.

15. The method of claim 12, wherein:
the mobile tag device carried by the object further detects orientation, speed, or acceleration of the object;
the location data further includes the orientation, the speed, or the acceleration of the object; and
the input feature dataset is generated further based on the orientation, the speed, or the acceleration of the object.

16. The method of claim 15, wherein the mobile tag device comprises a motion sensor.

17. The method of claim 12, further comprising generating a feedback data, by the machine learning algorithm trained model, to be delivered to the object.

18. The method of claim 17, wherein the safety related result includes a detection of an action of the object that does not comply with a safety protocol and the feedback data comprises an alert indicative of the detection delivered to the object via the mobile tag device.

19. The method of claim 17, wherein the feedback data comprises a control signal to effect an operation of the object.

20. The method of claim 12, wherein the computer vision output data comprises a description of the environment.

* * * * *